United States Patent [19]
Miyao et al.

[11] 3,880,017
[45] Apr. 29, 1975

[54] HYDROMECHANICAL TRANSMISSION

[75] Inventors: Takayuki Miyao; Minoru Ohya; Masatoshi Yamada; Toshitaka Kuno; Masao Yamaguchi; Haruo Katagiri; Katsuhiko Hattori; Masanori Sato, all of Nagoya, Japan

[73] Assignees: Aisin Seiki Kabushiki Kaisha, Kariya-shi; Kabushiki Kaisha Toyota Chuo Kenkyusho, Nagoya-shi; Toyota Jidosha Kogyo Kabushiki Kaisha, Toyota-shi, all of Japan

[22] Filed: Aug. 30, 1972

[21] Appl. No.: 284,765

[30] Foreign Application Priority Data
Aug. 30, 1971   Japan.............................. 46-66466

[52] U.S. Cl. .................. 74/687; 74/677; 74/720; 60/487
[51] Int. Cl. ... F16h 47/04; F16h 47/08; F16h 47/00
[58] Field of Search .......... 60/19, 487; 74/687, 677, 74/730, 720; 417/269, 212, 217; 91/472

[56] References Cited
UNITED STATES PATENTS

| | | | |
|---|---|---|---|
| 2,891,419 | 6/1959 | Badalini | 74/720 |
| 3,132,533 | 5/1964 | Baker | 74/687 |
| 3,204,486 | 9/1965 | De Lalio | 74/687 |
| 3,283,612 | 11/1966 | Densham | 74/687 |
| 3,714,846 | 2/1973 | Louis et al. | 74/687 |
| R27,307 | 3/1972 | De Lalio | 74/687 |

FOREIGN PATENTS OR APPLICATIONS
1,011,532   12/1961   United Kingdom............ 60/487

Primary Examiner—Samuel Scott
Assistant Examiner—P. S. Lall
Attorney, Agent, or Firm—Oblon, Fisher, Spivak, McClelland & Maier

[57] ABSTRACT

The present invention relates to a hydromechanical transmission which provides as infinitely variable speed ratio in two different stepdown transmission ranges. The transmission comprises a displacement pump having a first rotator connected to an input shaft and a second rotator connected to an output shaft for transmitting a portion of the torque supplied from the input shaft as the reaction torque and for generating high pressure oil, a variable displacement motor which is driven normally or reversely for changing the energy of the high pressure oil to the driving torque, a first transmission gear having a first clutch means for selectively transmitting the torque regenerated by the motor being driven in the normal direction, and a second transmission gear having a reverse mechanism and a second clutch means for transmitting selectively the torque regenerated by the motor when driven in the reverse direction.

46 Claims, 15 Drawing Figures

HYDROMECHANICAL TRANSMISSION

BACKGROUND OF THE INVENTION

1. Field Of The Invention

The present invention relates to a hydromechanical transmission disposed between a motor and a shaft to be driven, which drives the shaft in a wide range of speed in response to the rotational speed of the motor.

2. Description Of The Prior Art

As known in the art, transmissions of the type having a displacement pump and a displacement motor have serious defects such as the power being transmitted thereby being very low relative to the relatively large size thereof, so that the degree of the efficiency thereof is not effective, and that it is very difficult to drive the transmissions with a high speed for a long period of time. It has been proposed to use a displacement pump and a variable displacement motor. By this transmission, torque is transmitted in two ways, namely, a part of the torque is transmitted mechanically from the pump to an output shaft, and the other part thereof is fluidly transmitted through the displacement motor as oil pressure energy from the pump. In other words, the torque is transmitted hydromechanically. This hydromechanical transmission has relatively improved the torque transmission efficiency. However, this transmission is controlled by means of only the pump and the motor in the whole transmission stepdown range, so that it is difficult to transmit large scale torque, and it is also difficult to drive with a high speed continuously for a long time. Besides this, the whole transmission becomes too large due to the largeness of the respective units of the transmission. Therefore, this type of transmission has hardly been of practical use.

The present invention has been achieved in the studying to overcome the above defects of the conventional transmission.

SUMMARY OF THE INVENTION

Accordingly, it is an object of the present invention to provide a compact hydromechanical transmission which is simple in construction, high in transmitting efficiency of the torque and stable in a wide transmission stepdown range and also in driving with a high speed.

Another object of the present invention is to provide a hydromechanical transmission which can be driven both at a low stepdown transmission range and a high stepdown transmission range by switching the rotating direction of a displacement motor provided in the transmission in the normal direction or in a reverse direction and by controlling the selective operation of two clutch means respectively provided with two transmission gears having different stepdown transmission ranges.

Still another object of the present invention is to provide a hydromechanical transmission by which the rotation of an output shaft can be braked by the load of the motor, for example, the engine brake of a vehicle or the like, by forcedly operating one of two transmission gears.

A further object of the present invention is to provide a hydromechanical transmission which can drive reversely an output shaft against the rotating direction of an input shaft by means of forcedly operating two transmission gears.

The foregoing and other objects are attained by the hydromechanical transmission of the present invention which comprises a main casing, an input shaft journalled on the main casing, an output shaft journalled on the main casing, a positive displacement pump having a first rotator connected to the input shaft and a second rotator connected to an output shaft, a variable displacement motor mounted on the main casing and driven in a normal direction or in a reverse direction, the variable displacement motor having a rotator with a motor shaft, and displacement controlling means connected to the variable displacement motor for selectively varying the displacement thereof. An oil pressure circuit is provided for connecting the displacement pump and the variable displacement motor and features flow rate regulating means for controlling the volume of the high pressure oil to be supplied into the variable displacement motor. Switching means are included for changing the rotational direction of the variable displacement motor, and two transmission gears with different stepdown transmission ranges are disposed between the output shaft and motor shaft of the variable displacement motor, with one of the two transmission gears being provided with a reversely rotating mechanism and connecting selectively the output shaft and the motor shaft of the variable displacement motor driven in the reverse direction for driving the output shaft in the normal direction, and the other transmission gear selectively connecting the output shaft and the motor shaft of the variable displacement motor driven in the normal direction. Therefore, the torque supplied into the input shaft of the hydromechanical transmission is effectively transmitted partially from the displacement pump to the output shaft and partially from the displacement pump through the variable displacement motor and one of the two transmission gears to the output shaft so that the hydromechanical transmission can provide an infinitely variable speed ratio in two stepdown transmission ranges. Thus, the degree of the efficiency of torque transmission of the hydromechanical transmission is improved in the lower stepdown transmission range, a larger torque being transmitted, and in the higher stepdown transmission range, a higher speed being transmitted. The stepdown transmission ratio can be set widely, so that a desired torque on the output shaft can be obtained, and besides, the motor engine equipped with the hydromechanical transmission can be driven in its best driving condition.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts throughout the several Figures, and wherein.

3

Figure 1:
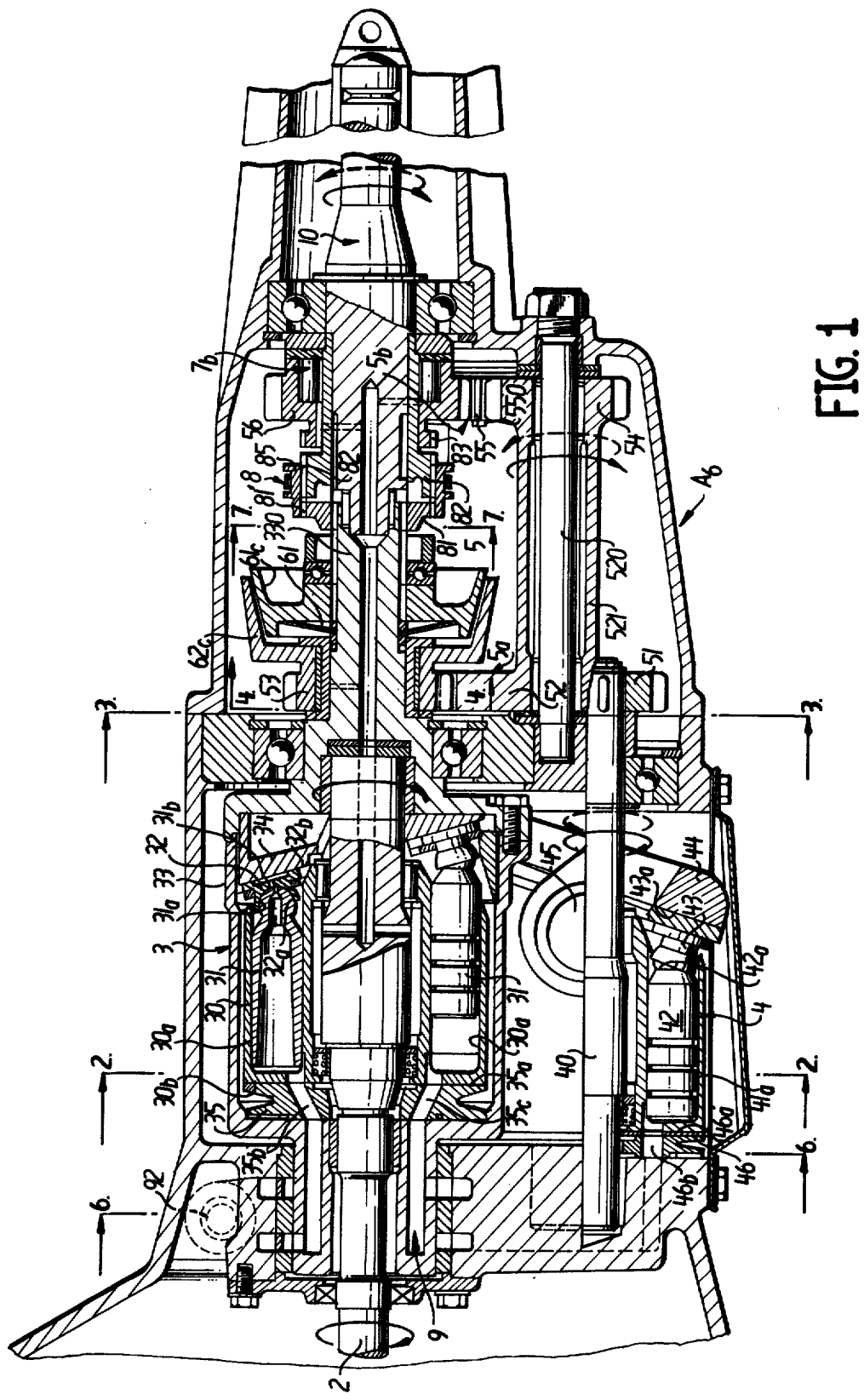
FIG. 1 represents a longitudinal cross-section view of the hydromechanical transmission of a first embodiment comprising a displacement pump, a variable displacement motor and two transmission gears respectively connecting two output shafts.
Figure 6:
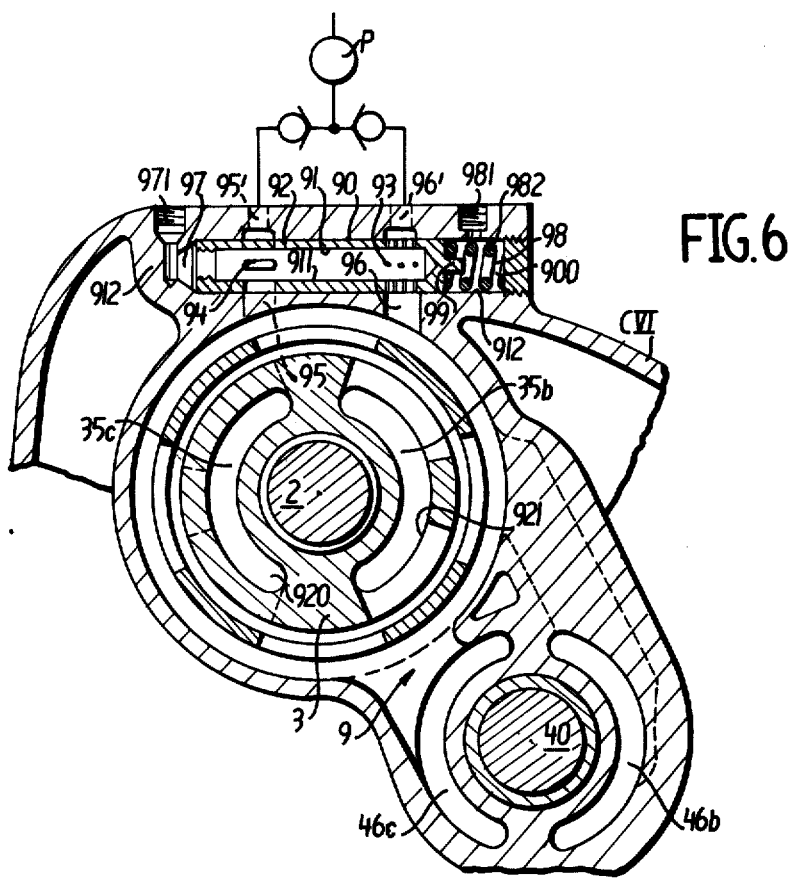
Figure 7:
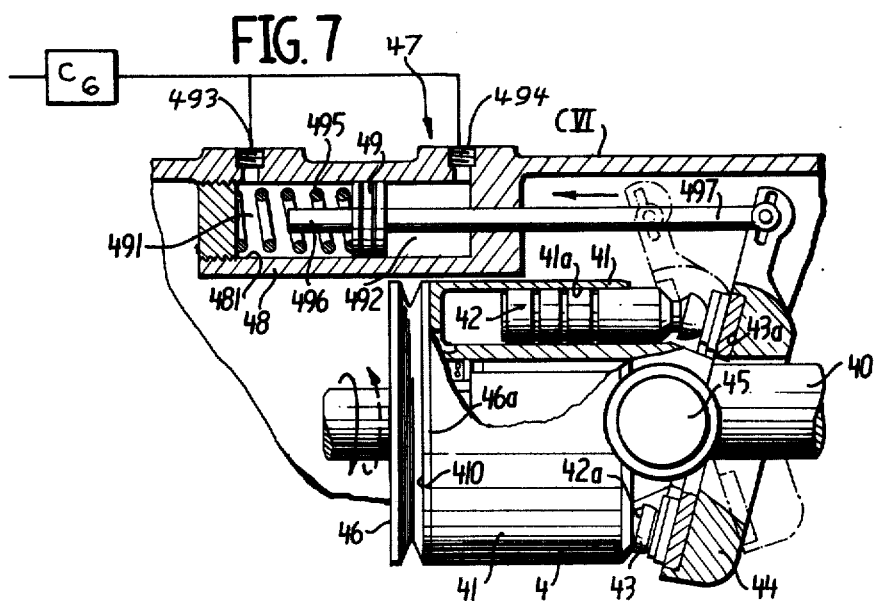
Figure 8:
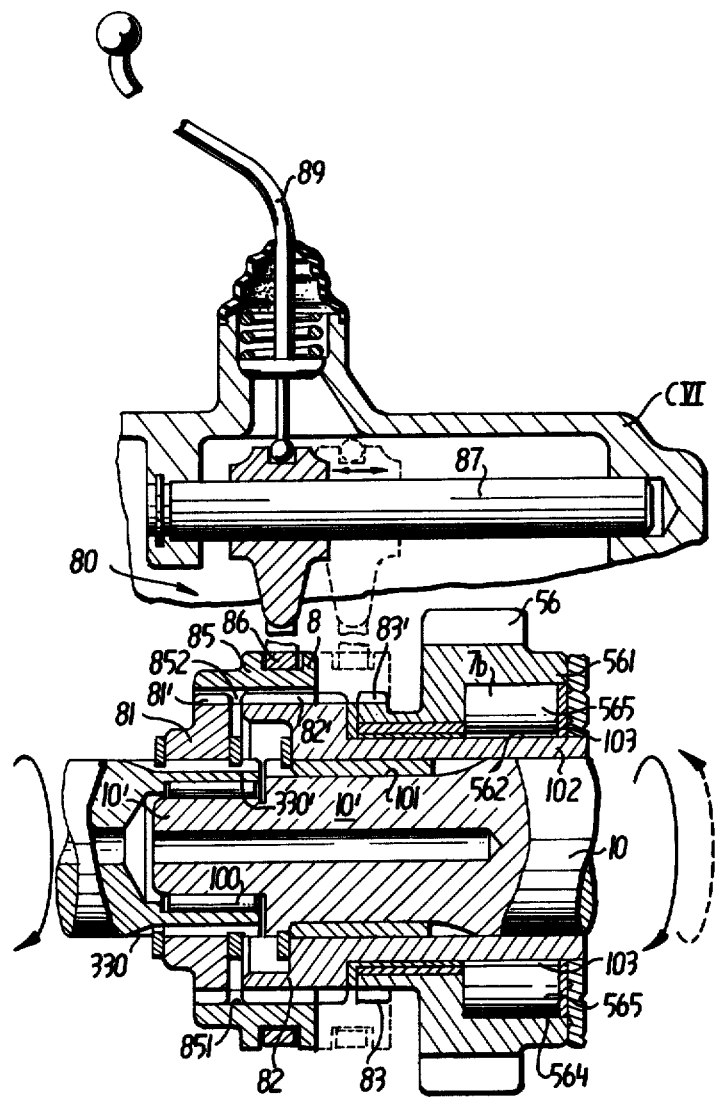
Figure 9:
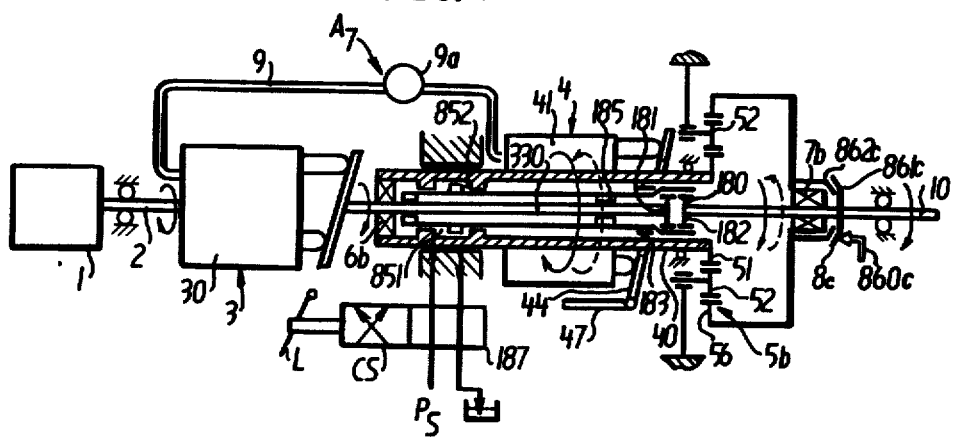
Figure 10:
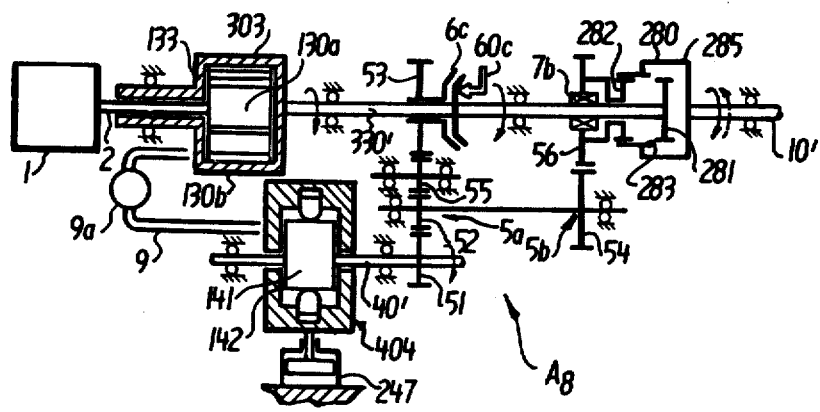
Figure 11:
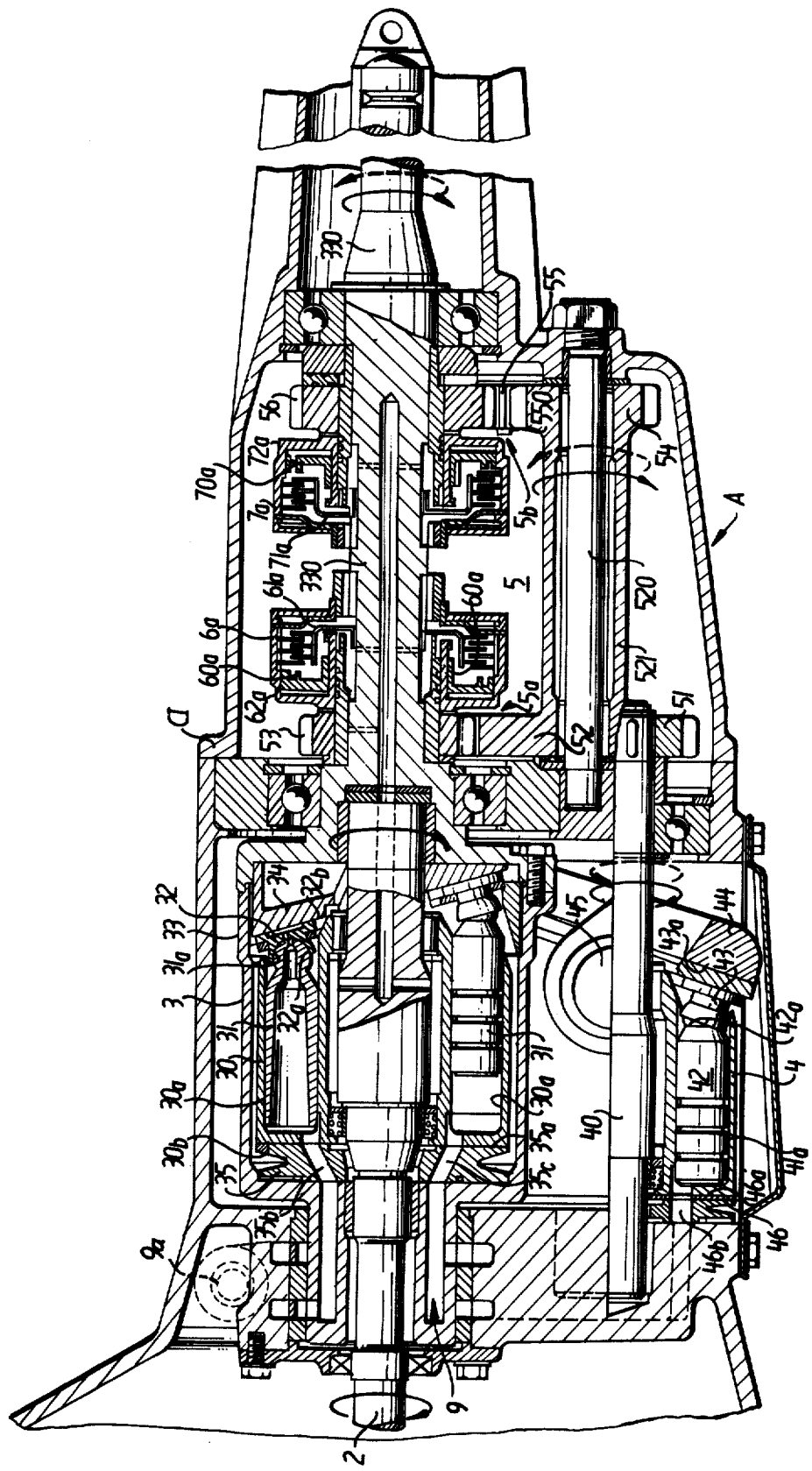
Figure 12:
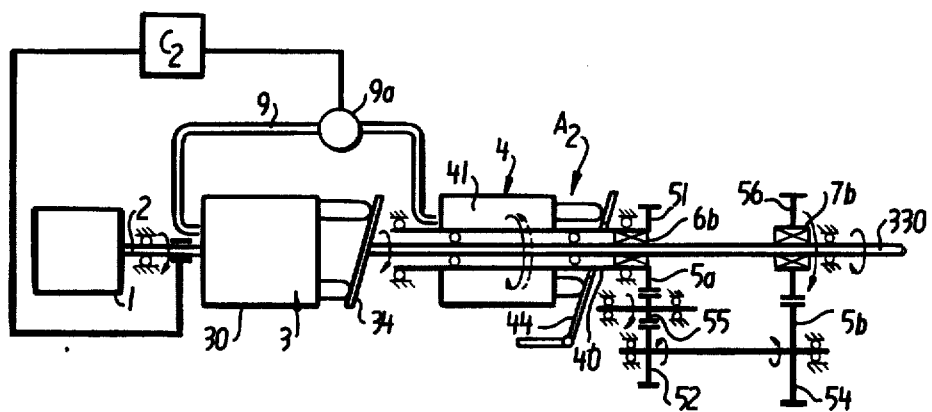
Figure 13:
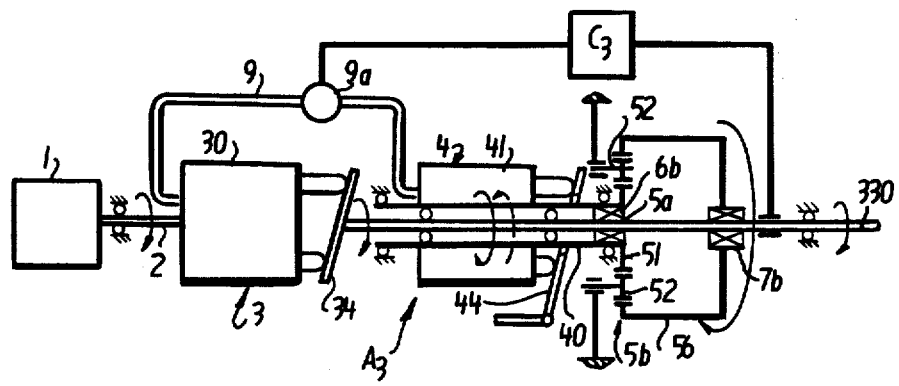
Figure 14:
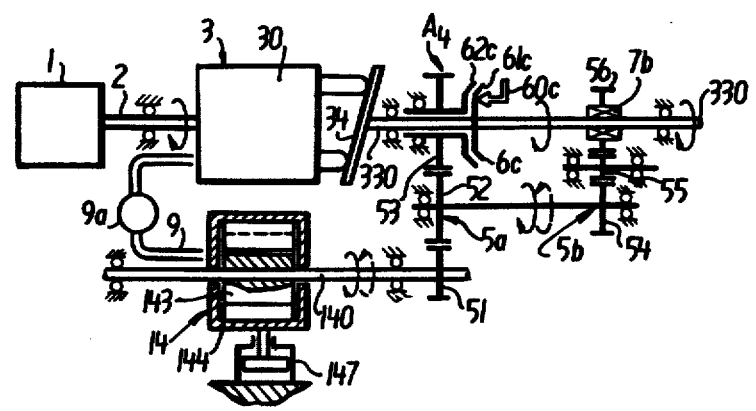
Figure 15:
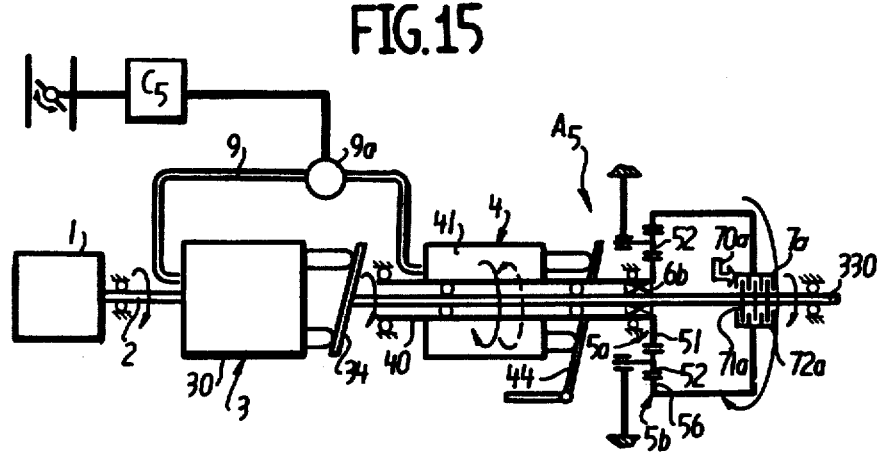

FIG. 6 represents a partially cut-away section view taken along the line 6—6 of FIG. 1;

FIG. 7 represents a partially cut-away, longitudinal section view of the variable displacement motor in FIG. 1;

FIG. 8 represents a longitudinal section view, being enlarged, of a portion of the device shown in FIG. 1;

FIG. 9 is a diagrammatic illustration of the hydromechanical transmission of a second embodiment, in which the pump and the motor are coaxially disposed and one of the two transmission gears is composed of planetary gears;

FIG. 10 is a diagrammatic illustration of the hydromechanical transmission of a third embodiment, in which a radial piston pump is used as the variable displacement motor and the two transmission gears are connected with the first output shaft;

FIG. 11 represents a cross-sectional view of the hydromechanical transmission of a fourth embodiment, in which two transmission gears are connected with the output shaft by multi-plate clutches, respectively;

FIG. 12 is a digrammatic illustration of the hydromechanical transmission of a fifth embodiment, in which the pump and the motor are coaxially disposed;

FIG. 13 is a diagrammatic illustration of the hydromechanical transmission of a sixth embodiment, in which one of the two transmission gears is composed of differential gears;

FIG. 14 is a diagrammatic illustration of the hydromechanical transmission of the sixth embodiment shown in FIG. 13, in which a radial piston type pump is used as the variable displacement motor; and FIG. 15 is a diagrammatic illustration of the hydromechanical transmission of a seventh embodiment, in which the pump and the motor are coaxially disposed and one of the two transmission gears is composed of differential gears.

DETAILED DESCRIPTION OF THE ILLUSTRATED EMBODIMENTS

Referring now to the drawings, and more particularly to FIGS. 1–8, the hydromechanical transmission of the first embodiment of the present invention is designated generally by reference character $A_6$ and is intended as the transmission for automobiles. As shown, the hydromechanical transmission is composed of an axial piston type pump 3 which, comprises a rotatable cylindrical drum 30 and a rotatable swash plate 34, the cylindrical drum 30 being drivingly connected to an input shaft 2 and the rotatable swash plate 34 being drivingly connected to a first output shaft 330, an axial piston motor 4 which is disposed in parallel relation with the pump 3 and comprises a rotatable cylindrical drum 41 with a motor shaft 40 and a tiltable swash plate 44 mounted on a main casing CVI which also can be normally or reversely driven, an oil pressure circuit 9 connecting the pump 3 with the motor 4, a first transmission gear 5a with a first clutch means 6c disposed between the rotatable shaft 40 of motor 4 and the first output shaft 330, a second transmission gear 5b with a second clutch means 7b disposed between the rotatable shaft 40 of motor 4 and a second output shaft 10 for driving the vehicles, and a third clutch means 8 disposed between the first and second output shafts 330 and 10, respectively. The three clutch means 6c, 7b and 8 engage or disengage selectively the first transmission gear 5a with the first output shaft 330, the second transmission 5b with

4 the second output shaft 10 and the first output shaft 330 with the second output shaft 10.

Figure 2:
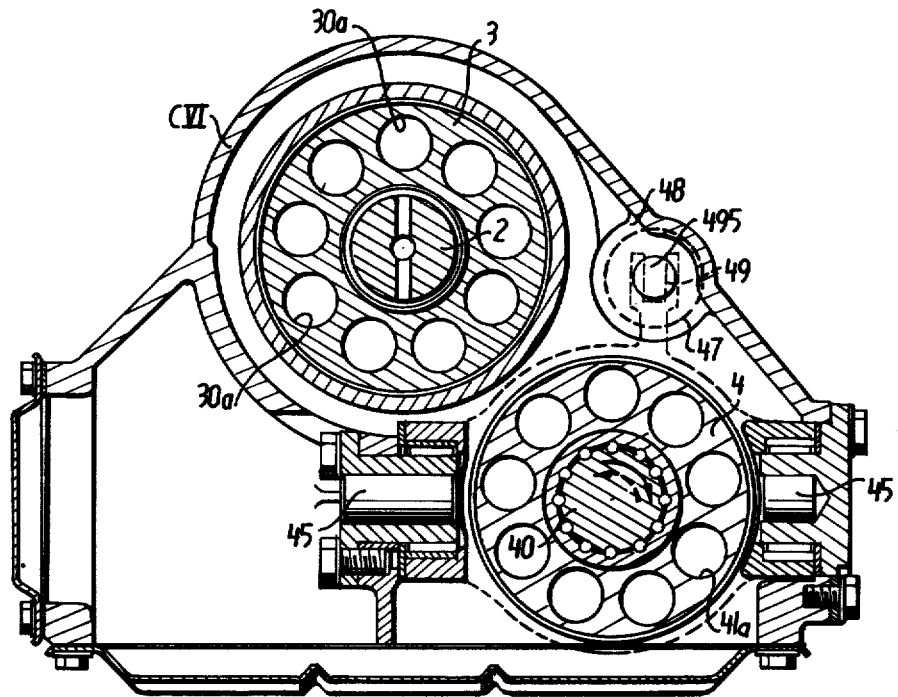
FIG. 2 represents a cross-sectional view taken along the line 2—2 of FIG. 1.
Figure 3:
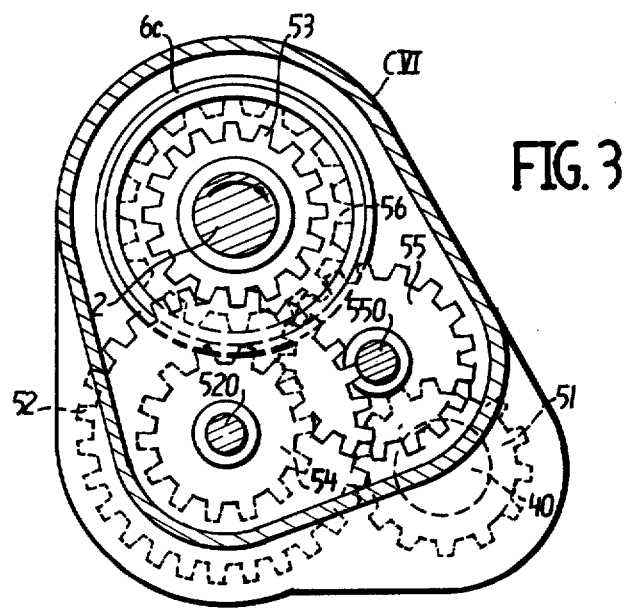
FIG. 3 represents a cross-sectional view taken along the line 3—3 of FIG. 1.

At first, the axial piston type pump 3 will be described in detail in accordance with FIGS. 1 and 2. Namely, the axial piston type pump 3 comprises the input shaft 2 which is also used as the output shaft of an engine, not shown, the cylindrical drum 30 fixed coaxially to the input shaft 2 by a spline connection and journalled on the main casing CVI for rotating with the input shaft 2 as one body, and the rotatable swash plate 34 having an inclined sliding surface and being coupled to a casing 33 which is journalled on the main casing CVI and is formed with the first output shaft 330 as one body. The cylindrical drum 30 is perforated with nine cylindrical holes 30a in the axial direction of the cylindrical drum 30, at equal distances from the center of the drum 30 and at regular intervals. Then, nine pistons 31 are fitted into the holes 30a in the fluid tight condition so that they can move reciprocably in the axial direction thereof. Each of the pistons 31 have a spherical end surface 31a swivelly received in a spherical socket 32a provided in a piston shoe 32. Each shoe 32 also includes a circular base portion 32b operating as a bearing face which slidably contacts the inclined sliding surface of the swash plate 34. An operation oil is introduced into the spherical socket 32a through a bore 31b of the piston 31. When the cylindrical drum 30 rotates relative to the casing 33 holding the swash plate 34, the pump 3 moves the pistons 31 reciprocably in the axial direction thereof so that it carries out the pumping operation.

On the other hand, the other end surface 30b of the cylindrical drum 30 slidably contacts the valve face 35a of a valve plate 35 which is fixed on the casing 33. The valve plate 35 has two semi-circular or arcuate slots 35b and 35c which are opposed to each other and are connected with a first and a second flow path 95 and 96, respectively, of the oil pressure circuit 9, as best seen in FIG. 6.

The axial piston type motor 4 has the same construction as that of the axial piston type pump 3, namely, as shown in FIGS. 1 and 7, the cylindrical drum 41 of the motor 4 is fixed to the motor shaft 40 by means of a spline connection so as to rotate with the motor shaft 40 as one body, while the motor shaft 40 is journalled on the adjacent wall of the main casing CVI to be parallel to the axial direction of the input shaft 2. Nine axially oriented cylindrical holes 41a are provided in the cylindrical drum 41 and nine pistons 42 are fitted thereinto. The pistons 42 make contact with the tiltable swash plate 44 through the sliding end surfaces 43a of the piston shoes 43 which swivelly receive spherical end surfaces 42a of the pistons 42. The tiltable swash plate 44 is, as shown in FIG. 7, axially supported at a trunnion shaft 45 which is tightly connected with the main casing CVI. Also, the tiltable swash plate controlling means 47 is provided on the main casing CVI to incline the tiltable swash plate 44 at an angle of inclination relative to the axis of the rotatable shaft 40 corresponding to the movement of an accelerator pedal, not shown, and corresponding to the driving condition. The tiltable swash plate controlling means 47, as shown in FIG. 7, comprises a closed cylinder 48 fixed on the adjacent wall of the main casing CVI, a valve rod 49 having a stopper 496 and a connecting rod 497, and spring means 495. Valve rod 49 is fitted into the cylinder 48 to form two chambers 491 and 492 therein. The stopper 496 of the valve rod 49 projects into the chamber 491 and the spring means 495 is provided in the chamber 491 to push the valve rod 49 to the right. At the end of the connecting rod 497 of the valve rod 49 is connected the tiltable swash plate 44 of the motor 4. Two oil paths 493 and 494 are made open respectively toward the oil chambers 491 and 492 and are connected independently with an oil source, not shown, through a regulator controlled by the accelerator pedal and the speed of the engine. Thus, the tiltable swash plate controlling means 47 controls the inclination of the tiltable swash plate 44 moving the valve rod 49 in its axial direction by two kinds of regulated oil pressures supplied in the oil chambers 491 and 492 independently, whereby the engine is operated at its best condition by means of the transmission $A_6$.

On the other hand, the other end surface 410 of the cylindrical drum 41 of the motor 4 slidably contacts the valve face 46a of a valve plate 46 which is fixed on the main casing CVI. The valve plate 46 has two semi-circular opposed arcuate slots 46b and 46c which are respectively connected with the semi-circular arcuate solts 35h and 35c of the pump 3 through the oil pressure circuit 9 provided in the adjacent wall of the main casing CVI as best seen in FIG. 6. The oil circuit 9 has a high pressure and low pressure flow paths 920 and 921, which connect the pump 3 with the motor 4, and a flow rate regulating valve 90 which is connected with the high pressure and low pressure flow paths through first and second flow paths 95 and 96, respectively. Also, a valve means $C_6$ for changing the rotational direction of the motor 4 is connected with the tiltable swash plate controlling means 47, and the rotary speed of the input shaft 2 and that of the second output shaft 10 are detected as the input signals. When the stepdown transmission ratio reaches the predetermined ratio during the time the automobile is running at the low stepdown transmission range, the signal is introduced into the valve means $C_b$, whereby the valve means cooperates with the tiltable swash plate controlling means 47, so that the tiltable swash plate 44 of the motor 4 is made to incline to the left, as shown with the dotted line in FIG. 7. This direction of the tiltable swash plate is reverse relative to the direction in driving at the low stepdown transmission range, and thus the cylindrical drum 41 of the motor 4 is rotated in the reverse direction relative to the direction of driving at the low stepdown transmission range. During this process, the torque transmission, which is operated through the second stepdown transmission gear 5b and the one-way clutch 7b in driving at the low stepdown transmission range, is released, and the first stepdown transmission gear 5a is engaged with the second output shaft 10, with the regenerated driving torque being transmitted to the second output shaft 10 through the first stepdown transmission gear 5a, the cone clutch 6c, the first output shaft 330, and the dog clutch 8. Thus, the tiltable swash plate is rapidly shifted to the driving condition of the high stepdown transmission range.

The flow rate regulating valve 90 comprises a tubular-shaped valve member 92 having a closed chamber and being slidably fitted into a valve hole 91 to be reciprocably movable in the axial direction of the valve hole 91 and is perforated with a plurality of small radial holes 93 through the wall part thereof and near one of the ends thereof. Near the other end of the valve member 92, a plurality of relatively large oval-shaped holes 94 are perforated through the wall part in the radial direction thereof and the holes 94 are made such that the longitudinal directions thereof coincide with the axial direction of the valve member. The group of the oval-shaped holes 94 and the group of the small holes 93 are respectively connected with the high pressure and the low pressure flow paths 920 and 921 of the oil circuit through the first and second paths 95 and 96 provided in the wall of the main casing CVI.

At both ends of the valve member 92, reciprocator means 900 are provided in order to control the conditions of the oval-shaped holes 94 and the first flow path 95, and of the small holes 93 and the second flow path 96. The reciprocator means 900 comprises a first and a second section chamber 97 and 98 which are formed at the both ends of the valve member 92 with the end faces of the valve member 92 and the inside wall 912 of the valve hole 91. Into the first section chamber 97, a governor pressure is introduced through a flow path 971, being proportional to the rotary speed of the engine. The second section chamber 98 is provided with a spring means 982 between the right end surface of the valve member 92 and the right inside wall of the valve hole 91 for pressing the valve member 92 toward the first section chamber 97 with a force proportional to a displacement of the valve member 92, and with a stopper 99 projecting from the valve member 92, and the second section chamber 98 is connected with a throttle valve, not shown, which is connected with an accelerator pedal, through a flow path 981 for introducing in the chamber 98 an operation oil under a throttle pressure proportional to the displacement of the accelerator pedal. Accordingly, when the total of the force applied from the spring means 982 and the throttle pressure in the second chamber 98, which is proportional to the displacement of the accelerator pedal, comes to be larger than the force applied from the governor pressure into the first chamber 97, the valve member 92 is pushed toward the left in the axial direction thereof. As the valve member 92 moves toward the left, the force of the spring means 982 decreases and the total force applied from the spring means 982 and from the throttle pressure comes to be equal to the force from the governor pressure, whereupon the valve member 92 is stopped at an equilibrium position to the left. At the same time, the oval-shaped holes 94 and the first flow path 95 and those of the small holes 93 and the second flow path 96 are made to be partially open, and the first and the second flow paths 95 and 96 are partially connected with each other through the valve member 92. Therefore a part of the high pressure oil in the high pressure side path 920 flows into the low pressure side path 921 through the flow rate regulating valve 90. Moreover, while the total force applied from the throttle pressure and from the spring means 982 is larger than the force applied from the governor-pressure, the valve member 92 is pushed toward the left and then high pressure oil flows back into the low pressure side path 921 through the flow rate regulating means 90. On the other hand, when the rotation of the engine increases and the force applied from the governor pressure in the first section chamber 97 comes to be larger than the total of the force applied from the spring means 982 and the throttle pressure in the second chamber 98, the valve member 92 is pressed toward the right in the axial direction, and the oval-shaped holes 94 and the first flow path 95 and those of the small holes 93 and the second flow path 96 are shifted to be closed. Then the flow of the operation oil between the first and the second paths 95 and 96, is cut off gradually as the governor pressure increases. Namely, the short-cut flow of the operation oil from the high pressure side path 920 to the low pressure side path 921 is released, and thus the whole volume of the operation oil from the pump 3 is supplied to the motor 4 through the oil circuit 9.

The two stepdown transmission gears 5a and 5b will be explained together with the three clutch means 6c, 7b and 8.

With respect to the first stepdown transmission gear 5a, a first gear 51 is fixed at one end of the rotatable shaft 40 of the motor 4 so that they can rotate as one body, and a second gear 52 which meshes with the first gear 51 is fixed to one end of a rotatable elongated tubular part 521 supported axially on a supporting shaft 520 fixed on the main casing CVI in parallel relation with the first output shaft 330 of the pump 3. At the first output shaft 330 of the pump 3 and near the second gear 52, a cone clutch 6c is provided as a first clutch means, being shown in FIGS. 1, 4 and 5. Generally, it consists of a first engagement member 61c, a second engagement member 62c and an elastic body 61. The second engagement member 62c is supported to be rotatable both in the normal direction and in the reverse direction and not to be movable in the axial direction on the first output shaft 330 coupled to the swash plate 34 of the pump 3. The first engagement member 61c is supported to be movable in both axial directions on the first output shaft 330 by means of a connecting means such as a key, a spline or the like, and the first engagement member 61c is opposed against the second engagement member 62c. The elastic body 61, made of an elastic material, such as a plate spring, a flush head spring or the like, is disposed between the engaging members 61c and 62c.

Figure 4:
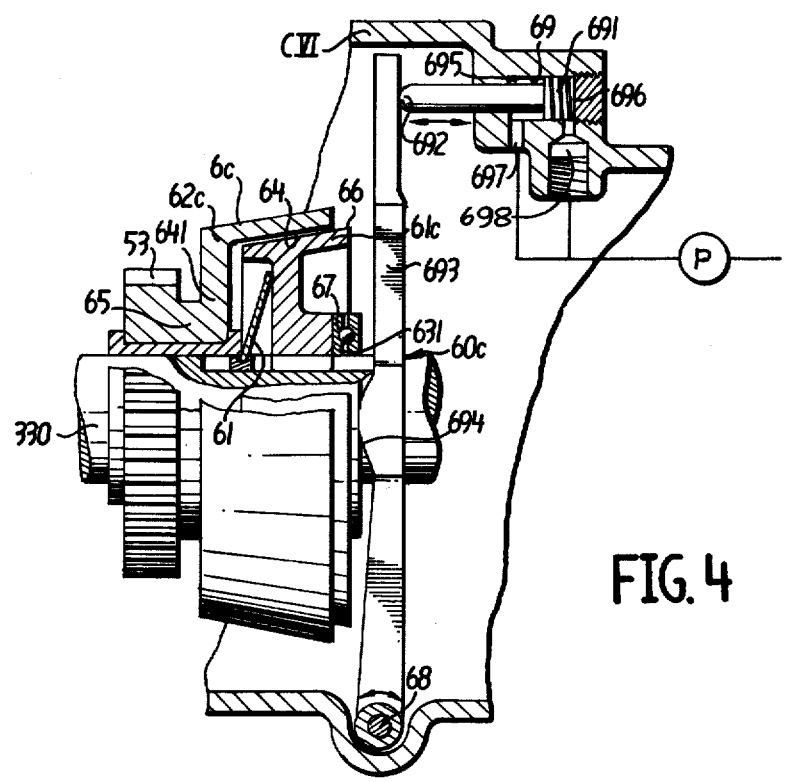
FIG. 4 represents a cross-sectional view taken along the line 4—4 of FIG. 1.
Figure 5:
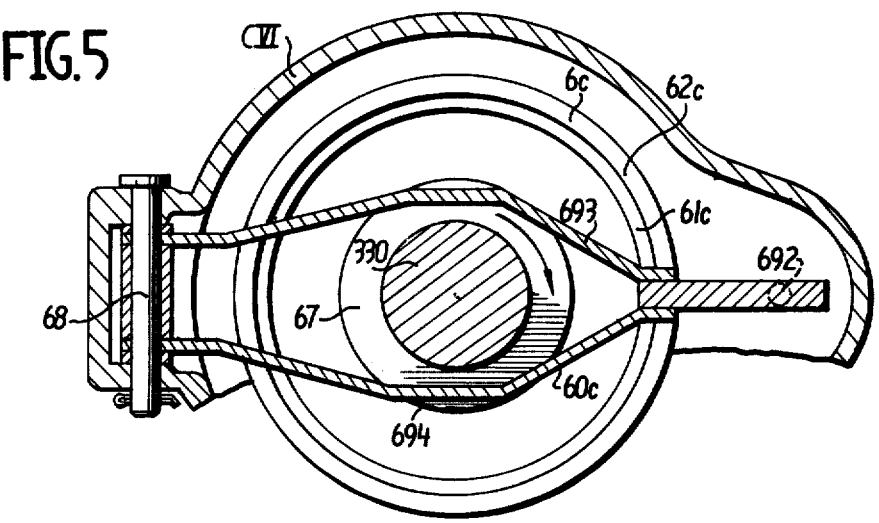
FIG. 5 represents a side view of FIG. 4.

As shown in FIGS. 4 and 5, the first engaging member 61c and the second engaging member 62c are disposed at a suitable interval by means of the elastic force of elastic body 61. A conical cylinder surface 64 is formed so as to engage with the inside of the second engaging member 62c, and an elongated pipe 65 lengthening in the axial direction is provided at its other end 641 and is supported axially on the first output shaft 330 so that it is coaxial with the first output shaft 330, and also it can relatively rotate freely. At the same time, a third gear 53 is provided at the outer surface of the elongated pipe 65 meshing with the second gear 52. On the other hand, a conical cylindrical surface 66 is formed as the engaging surface, nearly similar to the conical cylindrical surface 64 of the second engaging member 62c, at the outside of the first engaging member 61c.

The thrust bearing 67 is fitted within a little gap at the other end part 631 of first engaging member 61c, and the engaging member 61c is pressed at the central part of a connecting lever 693 through the thrust bearing 67. One end of the connecting lever 693 is pivotally supported at the wall part on the main casing CVI by means of connecting pin 68, and the other end thereof contacts a top end part 692 of a controlling valve rod 691 which is fitted into an oil pressure cylinder 69 provided on the main casing CVI. The inside of the oil pressure cylinder 69 is divided into a left chamber 695 and a right chamber 696 by means of the controlling valve rod 691, so that the two chambers are separated in a mutually isolated condition. Flow paths 697 and 698 connect either of the left chamber 695 and the right chamber 696 with a charge pump P, in FIG. 4, and with an oil tank, not shown, through a four-way selector spool valve, not shown. The four-way selector spool valve is connected with the tiltable swash plate 44 of the motor 4, so that the four-way selector spool valve is made to move reciprocably correspondent to the inclined degree toward the left or the right of the tiltable swash plate 44 in FIG. 7 and the flow paths 697 and 698 are thus operated to open and/or close. Therefore, when the operation oil is introduced into the right chamber 696 of the oil circuit through the four-way selector spool valve, the controlling valve rod 691 is shifted in the axial direction in the oil pressure cylinder 69 by the oil pressure, and the end part 692 of the controlling valve rod 691 presses the connecting lever 693, causing it to move with the axial center of the connecting pin 68 as its center, and the lever 693 presses the first engaging member 61c against the biasing force of the elastic body 61 inward of the conical cylindrical surface 64 of the second engaging member 62c, wherein it is fitted. The cylindrical surfaces 64 and 66 are made to contact and engage with each other, and the first and the second engaging members 61c and 62c are thus made to be rotatable as a unitary body, whereupon the first output shaft 330 and the third gear 53 are connected with each other to rotate together as a single unit.

When oil pressure is introduced into the left chamber 695, the engagement of the first engaging member 61c with the second engaging member 62c is released by the elastic force of the elastic body 61, and the first output shaft 330 and the third gear 53 then are made to be separately rotatable.

A dog clutch 8, hereinafter to be described in detail, is a third clutch means and connects the first output shaft 330 with the second output shaft 10. The torque regenerated by the motor 4 is transmitted to the second output shaft 10 through the first transmission gear 5a, the cone clutch 6c, the first output shaft 330 and the dog clutch 8.

The second transmission gear 5b transmits also the torque regenerated by the motor driven in the reverse direction, shown with a dotted arrow in FIG. 1, to the second output shaft 10. The second transmission gear 5b includes the first gear 51, second gear 52 of the first transmission gear 5a, a fourth gear 54 formed axially at the one end of the elongated tubular part 521 at the other end of which the second gear 52 is formed, a fifth gear 55 journalled to a supporting shaft 550 of the main casing CVI and used as a reverse mechanism and a sixth gear 56 formed integrally with a one-way clutch 7b. The fourth gear 54 and fifth gear 55, and the fifth gear 55 and sixth gear 56 are respectively in mesh. The one-way clutch 7b, shown in FIGS. 1 and 8, comprises a cylindrical member 102 and an elongated tubular member 561 provided with the sixth gear 56. The cylindrical member 102 is fixed on the second output shaft 10 by connecting means, such as a key, a spline or the like, and has several plane surfaces 103 with step parts formed around the peripheral outer surface thereof. On the other hand, a cylindrical surface 564 is formed at one of the ends of the elongated tube 561 which is coaxially superposed on the cylindrical member 102 and rolling members 565 such as balls, rollers and the like are interposed between each of the plane surfaces 103 of the cylindrical member 102 and the cylindrical surface 564 of the elongated tube 561. These rolling members 565 are interlocked in the gaps between the cylindrical surface 564 and the plane surfaces 103 with steps when the sixth gear 56 rotates faster than the second output shaft 10 in the normal direction shown with a solid arrow in FIG. 8, and the sixth gear 56 and the second output shaft 10 are thus made to be one body so that the torque is transmitted from the motor 4 to the second output shaft 10 through the second transmission gear 5b and the one-way clutch 7b.

Now, the dog clutch 8 mentioned above will be explained in connection with FIGS. 1 and 8. The dog clutch 8 comprises a first member 81 fixed at the right end part of the first output shaft 330, a second member 82 integrally formed on the cylindrical member 102 and fixed on the second output shaft 10, a third member 83 formed in the elongated tube 561 of the one-way clutch 7b, and a controlling means 80. The controlling means 80 has a ring member 85 which selectively connects the first member 81 with the second member 82 or the second member 82 with the third member 83. Essentially, these three members 81, 82 and 83 are coaxially arranged in a line, in which the second member 82 is positioned between the first member 81 and the third member 83, and the three members 81, 82 and 83 have gears 81', 82' and 83', all having the same teeth. The ring member 85 has an inner gear 852 and is arranged such that the ring member 85 is superposed coaxially on the three members 81, 82 and 83 and that the inner gear 852 meshes with one or two of the gears 81', 82' and 83' of the three members 81, 82 and 83. The engagement of the ring member 85 and one or two of the three members 81, 82 and 83 is controlled by moving ring member 85 in the axial direction with a connecting member 86 which is slidably supported on a shaft 87 fixed on the main casing CVI and is moved therealong by a manual lever 89 for shifting the ring member 85.

Namely, the manual lever 89 is operated, and then the connecting member 86 is moved in the axial direction relative to the shaft 87 toward the position shown with solid line in FIG. 8, whereupon the gears 81' and 82' of the first and the second members 81 and 82 are engaged with the inner gear 852 of the ring member 85, so that the first output shaft 330 and the second output shaft 10 are able to rotate as one body. Also, when the manual lever 89 is operated to move the connecting member 86 toward the position shown with the dotted line in FIG. 8, the engagement between the first and the second members 81 and 82 is released, and then the gears 82' and 83' of the second and the third members 82 and 83 are engaged with the inner gear 852 of the ring member 85, so that the second output shaft 10 and the sixth gear 56 can rotate as one body.

Having described the construction of the hydromechanical transmission $A_6$ of the first embodiment, its operations and its advantages will now be explained with respect to an automobile on which it is mounted.

A. Driving at the low stepdown transmission range

A-1. The ring member 85 of the dog clutch 8 is operated in the condition of forward driving as shown in FIG. 1. Namely, the first member 81 and the second member 82 of the dog clutch 8 are engaged with each other, and the first and second output shafts 330 and 10 are combined therewith.

A-2. The valve member 92 of the flow rate regulating means 90 is shifted to the left as shown in FIG. 6 when the automobile is not driven and the engine is in an idling condition. Namely, the total force supplied from the throttle pressure and from the spring member 982 is larger than that supplied from the governor pressure which is proportional to the rotational speed of the engine. Therefore, the valve member 92 is automatically moved and set at the left end position, and the first and second flow paths 95 and 96, which are disposed in the main casing CVI, are connected with each other, and the flow of the operation oil from the high pressure side path 920 to the low pressure side path 921 in the oil circuit 9 is free.

A-3. The tiltable swash plate 44 of the motor 4 is set to be inclined to the right at its maximum inclination angle as shown with the solid line in FIG. 7. Namely, the tiltable swash plate controlling means 47 automatically sets the tiltable swash plate 44 at the maximum inclination when the engine is idly rotating the vehicle is not moving.

At first, consider the case when the automobile is not moving, the accelerator pedal is not being pushed down, and the engine is idly rotating.

The engine is idly rotating at the determined rotary ratio, and the engine idly drives the input shaft 2 of the pump 3, but the second output shaft 10 is being stopped.

By the rotation of the cylindrical drum 30 corresponding to the rotation of the input shaft 2, the bearing surface 32b of the piston shoes 32 slide forcedly along the inclined sliding surface of the swash plate 34 and each piston 31 is reciprocated in the cylinder 30a of the cylindrical drum 30, so the displacement in the cylinder is changed repeatedly and continuously, and thus the absorbing process and the exhaust process of the operation oil are repeated.

At this time, the high pressure operation oil from the cylinder 30a is exhausted from the port of the cylindrical drum 30 through the high pressure side semi-circle 35c of the valve plate 30 and toward the high pressure side path 920 which is disposed in the main casing CVI. However, as shown in FIG. 6, the first and second flow paths 95 and 96 are shortly connected, and also the high pressure side path 920 of the oil pressure circuit 9 and the low pressure side path 921 are shortly connected by means of the flow rate regulating means 90 which is controlled by means of the governor pressure and the throttle pressure. Namely, the high pressure oil flows into the low pressure side path 921 without generating an oil pressure in the cylinders 30a of the pump, and therefore, the operation oil is not supplied from the pump 3 to the motor 4, and the motor 4 is kept in its stopping condition.

Next, the accelerator pedal is gradually pushed down. In response to the displacement of the accelerator pedal being pushed down, the throttle pressure increases proportionally and the engine rotates faster. Then the governor pressure increases proportionally to the rotational speed of the engine. The raising ratio of the governor pressure is set to be larger than that of the throttle pressure applied from the accelerator pedal and the valve member 92 is shifted by the pressing force of the governor pressure toward the right in the axial direction against the force of the spring means 982 inserted in the second section chamber 98 of the flow rate regulating means 90 and the pressure of the operation oil in the second chamber 98. The flow rate regulating means 90 closes gradually the opening thereof, so as to decrease gradually the volume of the operation oil which flows from the high pressure side path 920 to the low pressure side path 921 of the oil pressure circuit and to increase the pressure of the operation oil. Then the rotational speed of the cylindrical drum 30 of the oil pressure pump 3, driven by the engine, is increased and therefore, the exhausted volume of the high pressure operation oil per unit time is increased together with the increase of the reaction force applied to the swash plate 34 of the pump 3. This reaction force as the mechanical energy effectively rotates the swash plate 34 of the oil pressure pump 3 and the casing 33, and the high pressure operation oil rotates the motor 4 hydraulically.

A large amount of the operation oil with a high pressure is supplied to the cylinders 41a of the cylindrical drum 41 of the motor 4 through the oil circuit 9 and through the semi-circular arcuate slot 46c of the valve plate 46 of the motor 4 and drives the motor 4.

The pistons 42 in the cylinders 41a of the motor 4 are pressed toward the tiltable swash plate 44 in the axial direction parallel to the rotary shaft 40 by means of this oil pressure energy, and then, as shown in FIG. 1, the bearing faces of the piston shoe 43 are made to slide along the inclined sliding surface of the tiltable swash plate 44. Then the cylindrical drum 41 having the pistons is driven in the reverse direction, shown with the dotted line in FIG. 1. This rotary force is transmitted to the motor shaft 40 which is integrally connected with the cylindrical drum 41, and thus the oil pressure energy from the pump 3 is converted to mechanical energy.

The reaction force generated on the swash plate 34 of the pump 3 is transmitted to the casing 33 as the mechanical energy, and it is transmitted to the first member 81 of the dog clutch 8 disposed at the end part of the first output shaft 330, through the first output shaft 330 of the pump 3 formed as one body with the casing 33, and then it is transmitted to the second member 82 of the dog clutch 8 which is engaged with the said first member 81 by previously moving the ring member 85 in the axial direction, and finally it is transmitted to the second output shaft 10 for the vehicle. On the other hand, the oil pressure energy supplied to the motor 4 from the pump 3, is converted to mechanical energy by the motor 4, and this regenerated driving torque drives the motor shaft 40 of the motor 4 in the reverse direction. This torque is transmitted, through the second stepdown transmission gear 5b, to the second output shaft 10 for vehicles to rotate the shaft 10 in the normal direction. Namely, the regenerated driving torque is transmitted from the first gear 51 which is fixed at one end of the rotatable shaft 40 to be coaxially rotatable as one body, to the second gear 52 which meshes with the first gear 51, and moreover, the rotary direction is changed reversely by means of the fifth gear 55 as the reversely rotating mechanism which meshes with the fourth gear 54 connected as one body with the second gear 52 by the elongated tube 521, and then the sixth gear 56 meshing with the fifth gear 55 is driven to rotate in the normal direction, and therefore, the second output shaft 10 can be driven to rotate in the normal direction through the one-way clutch 7b. Finally, the automobile is started to move from the stopping condition by both the driving torque and the regenerated driving torque. In this case, the driving torque is transmitted as mechanical energy to the second output shaft 10 through the first output shaft 330 and the dog clutch 8 from the oil pressure pump 3, and the regenerated driving torque is, at first, supplied as oil pressure energy from the pump 3 to the motor 4, then the oil pressure energy is regenerated and converted to mechanical energy by means of the motor 4, and is transmitted to the second output shaft 10 for vehicles through the second stepdown transmission 5b and the one-way clutch 7b, from the rotatable shaft 40 of motor 4, so that the output shaft 10 for vehicles is driven in the direction shown with solid arrow in FIG. 6.

As the rotational speed of the engine is increased by pushing down the accelerator pedal, the valve member 92 of the flow rate regulating means 90 is moved further toward the right in the axial direction, and finally, it reaches the right end position where the stopper 99 of the valve member 92 makes contact with the side wall of the second section chamber 98. The short connection between the first flow path 95 and the second flow path 96 is entirely cut off, and the whole volume of the operation oil from the pump 3 is supplied to the motor 4, so that the motor 4 is effectively driven, and the second output shaft 10 for vehicles is driven to rotate in the normal direction through the second stepdown transmission gear 5b, and thus the automobile is accelerated.

Further as the accelerator is pushed down and the rotational speed of the engine is increased, the inclined angle of the tiltable swash plate 44 of the motor 4 is controlled to have the most suitable stepdown transmission ratio relative to the engine rotation by means of the tiltable swash plate controlling means 47. Namely, as the rotational speed of the engine increases, the engle of the tiltable swash plate 44 gradually approaches the upright condition from its maximum inclination angle. This process is carried out by supplying the oil pressure to the oil chamber 492 with the regulator of the tiltable swash plate controlling means 47 so that the operative condition of the engine becomes its best, and then the valve rod 49 of the tiltable swash plate controlling means 47 is moved toward the upright in FIG. 7. Therefore, the torque reaction force, operating to the swash plate 34 of the oil pressure pump 3, is increased as the rotational speed of the engine is increased, and the larger amount of oil pressure energy is supplied from the pump 3, and also the tiltable swash plate 44 of the motor 4 approaches to the upright state. Then the volume of the operation oil per each rotation of the cylindircal drum 41 of the motor 4 is decreased, and thus the cylindrical drum 41 is further accelerated to rotate in the reverse direction. Therefore, the second output shaft 10 for vehicles is further driven to rotate in the normal direction through the second stepdown transmission gear 5b and the one-way clutch 7b, and the automobile is further speeded up. Also, in case of this low stepdown transmission range, the operation oil, which is exhausted from the cylindrical drum 41 of the motor 4, and is lost as high pressure in driving the cylindrical drum 41, is sent back into the cylinders 30a in the cylindrical drum 30 of the pump 3, through the low pressure side semi-circle slot 46b of the valve plate 46 of the motor 4, the oil pressure circuit 9 disposed in the main casing CV1, and the low pressure side semi-circle slot 35b of the valve plate 35 of the pump 3. The operations of the pump 3 and the motor 4 described above are the same as in the case of driving at the high stepdown transmission range, which will be described hereafter.

B. During the high step-down transmission range

In the case of driving in the low stepdown transmission range described before, the accelerator pedal is gradually pushed down, and in response to this operation, the rotational speed of the engine is increased and the stepdown transmission ratio becomes large, and when the automobile is speeded up and the stepdown transmission ratio of the hydromechanical transmission reaches its determined value, the valve means $C_6$ for changing the rotational direction of the motor 4 is operated, and high pressure oil is supplied to the oil chamber 492 from the regulator. The tiltable swash plate 44 of the motor 4 is immediately changed to the inclined condition to the left hand-side shown with the dotted line in FIG. 7. Then the cylindrical drum 41 of the motor 4 and the motor shaft 40 are driven to rotate in the direction shown with the solid arrow in FIG. 7. This direction is reverse to the direction in driving at the low stepdown transmission range. When the stepdown transmission range is converted from the low range to the high range, the maximum inclination angle of the tiltable swash plate 44 is set at the high stepdown transmission range so that the ratio is hardly changed at the time.

While the tiltable swash plate 44 of the motor 4 is converted from the rightward inclination to the leftward inclination, the controlling means 60c of the cone clutch 6c is operated to engage with the dog clutch 8. Namely, the four-way selector valve, not shown, connecting with the tiltable swash plate 44, is moved to connect the right chamber 696 of the oil pressure cylinder 69, shown in FIG. 4, with the charge pump P, and also to connect the left chamber 695 of the cylinder 69 with the oil source, not shown. Then the controlling valve rod 691 is moved to the left in the axial direction of the cylinder 69, as shown in FIG. 4, and the connecting lever 693 is pressed, by the end part 692 of the controlling valve rod 691, so that the first engaging member 61c is moved to the left along the axial direction of the output shaft 330 of the pump 3 to engage as one body with the second engaging member 62c through the connecting lever. The third gear 53 formed as one body with the second engaging member 62c is connected with the first output shaft 330 of the pump 3.

Also, in the driving at the high stepdown transmission range when the accelerator pedal is gradually pushed down, the rotational speed of the engine is increased in response to the displacement of the accelerator pedal, and the torque reaction force operated to the swash plate 34 of the pump 3 and the casing 33 is increased corresponding to the input shaft torque transmitted from the engine. Thus, the increased torque reaction force effectively drives to rotate the second output shaft 10 for vehicles in the normal direction through the dog clutch 8.

Further, the high pressure operation oil is supplied from the pump 3 due to the relative rotation between the cylindrical drum 30 and the swash plate 34, and the operation oil is sent into the cylinders 41a of the cylindrical drum 41 of the motor 4 through the same route as in the driving condition at the low stepdown transmission range described above. The oil pressure in the cylinders 41a presses the pistons 42 toward the tiltable swash plate 44, which is reversely inclined compared with the case of driving in the low stepdown transmission range, and rotates the cylindrical drum 41 in the normal direction, which is reverse to the rotational direction at the low stepdown transmission range. Thus the oil pressure energy from pump 3 is regenerated and converted to mechanical energy and the regenerated driving torque on the cylindrical drum 41 is transmitted to the second output shaft 10 through the first stepdown transmission range 5a the cone clutch 6c, the f. . output shaft 330 and the dog clutch 8. At this time, the driving torque of the motor 4 is transmitted to the sixth gear 56 through the fifth gear 55 from the fourth gear 52 of the second stepdown transmission gear 5b. However, the sixth gear 56 is driven to rotate reversely relative to the rotary direction of the second output shaft 10, therefore, the one-way clutch 7b does not work and the sixth gear 56 idly rotates on the second output shaft 10.

As the accelerator pedal is pushed down further, the rotational speed of the engine is increased, and also the rotary ratio of the first output shaft 330 of the pump 3 is increased corresponding to the increased torque reaction force. At the same time, the volume of the high pressure operation oil from the pump 3 is increased per unit time. On the other hand, with respect to the tiltable swash plate 44 of the motor 4, the pressure oil corresponding to both rotational speeds of the engine and output shaft 10 is supplied into the oil chamber 491 by means of the regulator of the tiltable swash plate controlling means 47, and the valve rod 49 is shifted to the right in the axial direction, and the inclination angle of the tiltable swash plate is made small, and then the absorbing and/or exhausting volume of the operation oil in the motor 4 is decreased, and therefore the rotary ratio of the cylindrical drum 41 of the motor 4 is increased per unit time. This is transmitted to the first output shaft 330 through the first stepdown transmission gear, namely the first gear 51, the second gear 52 and the third gear 53, and finally the rotary ratio of the second output shaft 10 is increased and the automobile is accelerated. When the accelerator pedal is pushed down further, the automobile is further accelerated as well as the increasing of the rotary ratio of the engine in response to the displacement of the accelerator pedal, and the tiltable swash plate 44 of the motor 4 comes to its upright condition, where the inclination angle is zero, and the input and/or the output volume to and/or from the oil pressure motor 4 becomes zero. At this time, the controlling means 60c of the cone clutch 6c is operated by detecting the zero condition of the inclination angle, and the engagement is released between the first stepdown transmission gear 52 and the first output shaft 330, and the cylindrical drum 30 of the pump 3, the casing 33 and the rotary swash plate 34 are rotated as one body, and then the second output shaft 10 is driven at the same rotary ratio as that of the engine, and finally the stepdown transmission ratio of the hydromechanical transmission becomes 1, or namely the directly connected condition is realized.

C. Backward driving

C-1. The manual lever 89, FIG. 8, is operated, and the ring member 85 is set to the backward driving condition. Namely, the ring member 85 is shifted from its left end to its right end, as shown with the dotted lines in FIG. 8, to release the engagement between the first member 81 and the second member 82 and to engage the second member 82 with the third member 83. Now, the sixth gear 56 of the second transmission gear 5b is connected to the second output shaft 10 with the dog clutch 8 to be rotated as one body.

The valve means $C_6$ for changing the rotational direction of the motor, which cooperates with the ring member 85, is controlled in the same condition as in the case of driving at the high stepdown transmission gear so that the tiltable swash plate 44 of the motor 4 is made to be inclined toward the left as shown with the dotted line in FIG. 7. Namely, the rotatable shaft 40 of the motor is set to be driven in the normal direction.

C-2. The cone clutch is operated to connect the first stepdown transmission gear 5a with the first output shaft 330. Namely, the four-way selector spool valve, which cooperates with the tiltable swash plate 44, is moved in order to connect the right chamber 696 of the oil pressure cylinder 69 with the charge pump P, and the left chamber 695 with the oil pool, not shown. Then, the first engaging member 61c of the cone clutch 6c is engaged with the second engaging member 62c by moving the controlling valve rod 691 to the left in the axial direction as shown in FIG. 4.

Under the hydromechanical transmission $A_6$ described above, the torque reaction force, which is generated as mechanical energy on the swash plate 34 of the pump 3 is transmitted to the second gear 52 of the second transmission gear 5b through the first output shaft 330, the cone clutch 6c and the third gear 53 of the first transmission gear 5a.

On the other hand, the rotary driving torque is supplied to the motor 4 from the pump 3 as the oil pressure energy, and is converted to mechanical energy by means of the motor 4, and operates the rotatable shaft 40. The torque is also transmitted to the second gear 52 through the first gear 51, so that the whole torque is transmitted to the second gear 52 from the pump 3. Then the torque is transmitted to the second output shaft 10 through the second stepdown transmission gear 5b and the dog clutch 8. At the same time, the rotational direction of the motor 4 is changed reversely by the fifth gear 55 of the second stepdown transmission gear 5b, such that the second output shaft 10 is driven in the reverse direction shown with the dotted line in FIG. 1. During the backward driving, the flow rate regulating means 90 is automatically operated the same as in the case of the forward driving described above so that the automobile with this hydromechanical transmission $A_6$ is smoothly started and accelerated corresponding to the rotational speed of the engine.

D. Engine brake operation

An engine brake pedal, not shown, is provided in the hydromechanical transmission $A_6$ of the first embodiment, being connected with the valve means $C_6$ for changing the rotational direction of the motor 4 and the tiltable swash plate controlling means 47. When the engine brake pedal is pushed down, the inclination angle of the tiltable swash plate 44 of the motor 4 is shifted toward its maximum inclination in response to the displacement of the engine brake pedal and this condition is maintained, and then the engine brake can be effectively operated at any stepdown transmission ratio desired. When the engine brake operation becomes necessary during driving the automobile, the engine brake pedal is pushed down, corresponding to the degree of the necessity of engine brake operation. Then the valve means $C_6$ for changing the rotational direction of the motor 4 connecting with the engine brake pedal, is operated, and the tiltable swash plate 44 of the motor 4 is set to the inclined condition shown with the dotted line in FIG. 7, the same as in the case of the forward high speed ratio driving. At the same time, the tiltable swash plate controlling means 47, connecting with the engine brake pedal, is operated and the inclination angle of the tiltable swash plate 44 of the motor 4 is set to the determined angle, so that the stepdown transmission ratio is set in proportion to the displacement of the engine brake pedal. Besides, the controlling means 60c of the cone clutch 6c, connecting with the tiltable swash plate 44, is operated and the cone clutch 6c is made to be engaged.

When the engine brake pedal is pushed down during the time the automobile is running, the engine brake operation mentioned above is automatically carried out, and the running torque is transmitted to the casing 33 of the pump 3 and the rotary swash plate 34 from the second output shaft 10 for vehicles, through the dog clutch 8, and the first output shaft 330, and also is transmitted to the rotatable shaft 40 of the motor 4, through the first stepdown transmission gear 5a, and then the cylindrical drum 41 of the motor 4 is driven to be rotated. By the rotary operation of the cylindrical drum 41, the piston shoe 43 is slid along the tiltable swash plate 44 having the suitable inclination angle, and the piston 42 reciprocates in the cylinder 41a to carry out the pump operation. The oil pressure energy, generated by the process described above, is supplied into the cylinder 30a of the pump 3 through the valve plate 46, the oil pressure circuit 9 and the valve plate 35 of the pump 3. The oil pressure pump 3 carries out the motor operation by receiving above oil pressure energy from the motor 4, and the cylindrical drum 30 relatively rotates faster than the tiltable swash plate 34 in order to effectively drive the engine through the input shaft 2. So, good efficiency of the engine brake operation always can be obtained even if the speed of the automobile is slow.

The hydromechanical transmission $A_6$ of the first embodiment is applied to the automobile, whereby various automatic controlling mechanisms such as the flow rate regulating means 90, the tiltable swash plate controlling means 47, the valve means $C_6$ for changing the rotational direction of the motor 4, and the like are added. But it is of course possible to employ the manual controlling mechanisms, according to use other than as described before, and it is adequately able to employ these mechanisms without any limitations.

The hydromechanical transmission $A_6$ of the first embodiment has been explained in detail, and the next table will be shown for the convenience of understanding the first embodiment, showing the relationship between the operation of the respective construction elements of the hydromechanical transmission $A_6$ of the first embodiment and their driving conditions.

| main construction elements | Driving Condition | | | |
|---|---|---|---|---|
| | (A) forward driving at a low stepdown transmission range | (B) forward driving at a high stepdown transmission range | (C) backward driving | (D) engine brake operation |
| oil pressure pump 3 (input shaft 2 of speed change gear device) | rotation in the normal direction | rotation in the normal direction | rotation in the normal direction | rotation in the normal direction |

— Continued

| main construction elements | | Driving Condition | | | |
|---|---|---|---|---|---|
| | | (A) forward driving at a low stepdown transmission range | (B) forward driving at a high stepdown transmission range | (C) backward driving | (D) engine brake operation |
| oil pressure motor 4 | rotational direction | reverse rotation | normal rotation | normal rotation | normal rotation |
| | inclination of tiltable swash plate 44 | right hand | left hand | left hand | left hand |
| stepdown transmission means 5 | a first stepdown transmission gear 5a | idle rotation | operation | operation | operation |
| | a second stepdown transmission gear 5b | operation | idle rotation | operation | idle rotation |
| Clutch means | a first clutch means 6c | separation | engagement | engagement | engagement |
| | a second clutch means 7b | engagement | separation | separation | separation |
| | a third clutch means 8 | engagement of first and second members | engagement of first and second members | engagement of second and third members | engagement of first and second members |
| | flow rate regulating means 90 | from short connection to cut off | cut off | from short connection to cut off | cut off |
| output shaft 10 | | rotation in the normal direction | rotation in the normal direction | rotation in the reverse direction | rotation in the normal direction |

As described above, the hydromechanical transmission $A_6$ of the first embodiment can provide an infinite variable and wide stepdown transmission ratio in two different stepdown transmission ranges and a relatively high torque compared with the size thereof due to the combination of the axial piston type pump 3, the variable axial piston type motor 4 which can be driven in a normal direction or in a reverse direction, the first stepdown transmission gear 5a which selectively transmits the torque from the motor 4 being driven in the normal direction, and the second transmission gear 5b having the reverse, or fifth gear, 55 which transmits the torque from the motor 4 when being driven in the reverse direction. Also, the hydromechanical transmission $A_6$ can be operated to brake the automobile by forcedly connecting the second output shaft 10 and the motor 4 with one of the two stepdown transmission gears 5a and 5b. Further, the hydromechanical transmission $A_6$ can drive the automobile backwardly by forcedly connecting the first output shaft 330 and the second output shaft 10 with the two stepdown transmission gears 5a and 5b.

Moreover, the hydromechanical transmission $A_6$ can drive the automobile in the most suitable driving condition of the engine by infinitely changing the stepdown transmission ratio of the motor 4 through the tiltable swash plate controlling means 47, and therefore the power supplied from the engine can be used effectively, the maximum torque is applied to the automobile, the accelerating ability is improved, and also the fuel power ratio is improved.

Further, the one-way clutch 7b can be used as the second clutch means by the motor running normally or reversely, and can eliminate the complex controlling means for the second clutch means.

The hydromechanical transmission $A_7$ of the second embodiment, which is diagrammatically shown in FIG. 9, is one of the modifications of the hydromechanical transmission $A_6$ of the first embodiment. Most of the parts and constructions of the hydromechanical transmission $A_7$ of the second embodiment are the same as those of the transmission $A_6$ of the first embodiment. Also, the operation and effects of the second embodiment are almost the same as those of the first embodiment. The main differences between the first embodiment and the second embodiment are the arrangements of the pump 3, motor 4, and the two transmission gears 5a and 5b.

The construction of the hydromechanical transmission $A_7$ of the second embodiment will be explained according to FIG. 9. Mainly, its differences, compared with the first embodiment, will be described. In FIG. 9, the same parts as those of the first embodiment will be shown with the same reference characters, and the description about them will be omitted. In the hydromechanical transmission $A_7$ of the second embodiment, an axial piston type pump 3, which is the same as that of the first embodiment, is employed as the positive displacement pump and a variable axial piston type motor 4, which is also the same as that of the first embodiment, is used as the variable displacement motor. The motor 4 has a cylindrical shaft 40, a cylindrical drum 41 which is coaxially fixed on the cylindrical shaft 40, and a tiltable swash plate 44 having a central opening through which the cylindrical shaft 40 penetrates. The cylindrical shaft 40 of the motor is axially and rotatably supported on a first output shaft 330 fixed on a swash plate 34 of the pump 3. A first one-way clutch 6b as the first stepdown transmission gear is disposed between the first output shaft 330 and the cylindrical shaft 40 of the motor 4. The one-way clutch engages the cylindrical shaft 40 and the first output shaft when the cylindrical shaft 40 rotates faster than the first output shaft 330 in the normal direction shown with a solid arrow line. A second output shaft 10 is axially connected to the end part of the first output shaft 330 with a dog clutch 180. A differential gear train 5b as the second stepdown transmission gear is provided between the cylindrical shaft 40 and the second output shaft 10. The differential gear train 5b comprises a first gear 51 which is provided as the sun or central gear at one end of the cylindrical shaft 40, a second gear 52 as the planet or peripheral gear which meshes with the first gear 51 and is supported at the fixing part of the main casing, and a sixth gear 56 which meshes with the second gear 52 and works as the ring gear. The sixth gear 56 is axially supported on the second output shaft 10 through the second one-way clutch which engages the sixth gear 56 and the second output shaft 10 when the sixth gear 56 rotates faster than the second gear in the normal direction marked with a solid arrow line in FIG. 9. The dog clutch 180 is disposed between the first and second output shafts 330 and 10 and also in the cylindrical drum 41 of the motor 4. The dog clutch 180 comprises a cylindrical connecting member 185 which is slidably and rotatably supported on the first output shaft 330, a first engaging member 181 fixed on the first output shaft, a second engaging member 182 fixed on the second output shaft 10, a third engaging member 183 fixed on the inner surface of the cylindrical shaft 40 and a hydraulic mechanism 187 which slides the cylindrical connecting member 185 to the left or to the right in the axial direction in FIG. 9 for connecting the first engaging member 181 and the third engaging member 183 or for connecting the first engaging member 181 and the second engaging member 182. The hydromechanism is composed of two chambers 851 and 852 which are provided between the cylindrical shaft 40 and the cylindrical connecting member 181 of the dog clutch 180, and of a spool valve CS having a control lever L and an oil circuit. Near the second one-way clutch 7b, a cone clutch 8c is provided to connect the sixth gear 56 of the second transmission gear 5b with the second output shaft 10. The cone clutch comprises a first engaging member 861c fixed on the second output shaft 10, a second engaging member 862c fixed on the sixth gear 56, and a cone clutch controlling mechanism 860c for engaging or disengaging the first and second engaging members 861c and 862c.

The hydromechanical transmission $A_7$ described above provides an infinitely variable speed ratio in a low stepdown transmission range and a high stepdown transmission range by setting the dog clutch 180 in the forward driving condition the same as the hydromechanical transmission of the first embodiment. When it is necessary to put the engine brake into operation, the ring gear 56 is connected with the second output shaft 10 by operating the cone clutch controlling mechanism 860c of the cone clutch 8c, and the flow rate regulating valve 9a of the oil pressure circuit, which is the same as that of the first embodiment, is set in the condition of the low stepdown transmission range. The torque of the second output shaft 10 supplied from the automobile is transmitted to the swash plate 34 of the pump 3 through the dog clutch 180 and the first output shaft 330, and rotates the swash plate 34 in the normal direction shown with the arrow marked with solid line. Also, the torque from the second output shaft 10 is transmitted to the motor 4 through the cone clutch 8c, the second transmission gear 5b and the cylindrical shaft, and operates the motor 4 as a pump. The generated oil pressure energy of the motor 4 is supplied to the low pressure side port of the pump through the oil pressure circuit and the flow rate regulating valve 9a so that the cylindrical drum 30, which is connected with the engine, is driven in the normal direction. Thus, the torque of the second output shaft 10 forcedly rotates the engine, and the engine brake operation can be effectively performed by absorbing the torque of the second output shaft 10.

In the case of backward driving, the spool valve CS connecting to the control lever L is moved to the right as seen in FIG. 9, which is reverse to the condition of the spool valve in FIG. 9. The cylindrical connecting member 185 is moved to the left in the axial direction by supplying oil pressure from the pump to the right chamber 852. Then the engagement of the first engaging member 181 disposed at the first output shaft 330 is released from the second engaging member 182 disposed at the second output shaft 10, and the third engaging member 183 is engaged with the first engaging member 181. At the same time, the ring gear 56 is forcedly connected as one body with the second output shaft 10 by means of the cone clutch 8c.

During the backward driving, the engine 2 drives the cylinder drum 30 of the pump 3 through the input shaft 2 so that the pump generates the oil pressure energy due to the relative rotation between drum 30 and the rotatable swash plate 34. The motor 4 is driven in the normal direction by the oil pressure energy, and the oil pressure is converted to mechanical energy. Then the mechanical energy is transmitted to the cylindrical shaft 40 driven in the normal direction. Also, the mechanical energy, generated on the rotatable swash plate 34 of the pump by the reaction force of the pump 3, drives the cylindrical shaft 40 in the normal direction and is transmitted to the cylindrical shaft 40. Therefore, both the mechanical energy from the motor 4 and from the rotatable swash plate 34 are transmitted to the rotatable swash plate 44. Then the mechanical energy is transmitted to the second output shaft 10 through the second stepdown transmission gear 5b. At the same time, the planet gear 52 changes its rotational direction and drives the ring gear 56 in the reverse direction. Thus, the second output shaft 10 is driven in the reverse direction through the cone clutch 8c.

The hydromechanical transmission $A_8$ of the third embodiment, which is diagrammatically shown in FIG. 10, is another modification of the hydromechanical transmission $A_6$ of the first embodiment. Most of the parts and constructions of the hydromechanical transmission $A_8$ of the third embodiment are the same as those of the first embodiment. Also the operation and effects of the third embodiment are almost the same as those of the first embodiment. The main differences between the first embodiment and the third embodiment are the positive displacement pump, the variable and positive displacement motor, the arrangements of the second and third clutch means, and the valve means for changing the rotational direction of the variable displacement motor.

The construction of the hydromechanical transmission $A_8$ of the third embodiment will be explained according to FIG. 10. However, mainly its differences, compared with the first embodiment will be described. In FIG. 10, the parts which are the same as those of the first embodiment will be shown with the same reference characters, and the description about them will be omitted.

As the positive displacement pump of the hydromechanical transmission $A_8$ is employed, a gear pump 303 is employed which comprises a rotatable casing 133 having a first and a second gear 130a and 130b, disposed therein. The first gear 130a is connected to the motor 1 through the input shaft 2. The second gear 130b disposed in the casing 133 is journalled on a shaft fixed on the inner wall of the casing 133 and meshes with the first gear 130a. The first and second gears 130a and 130b make two closed chambers in the casing 133, and the casing 133 is provided with the first output shaft 330' which is coaxial with the input shaft 2. The first gear 130a is rotated with respect to the casing 133 by the motor 1 through the input shaft 2 so that the pumping operation of the pump 303 is carried out and the high pressure oil is produced. On the other hand, the reaction force applied to the casing 133 through the shaft of the second gear 130b from the pressure of the oil rotates the casing in the normal direction. Therefore, this gear pump 303 works the same as the axial piston type pump 3 of the first embodiment.

As the variable displacement motor of the hydromechanical transmission $A_H$, a radial piston type motor 404 having adjusting means 247 for selectively varying the displacement thereof, is employed. The radial piston type motor 404 comprises a rotator 141 with a shaft 40' and a shiftable casing 142 which moves perpendicular to the axis of the rotator 141 to vary the displacement of the motor 404 by means of the adjusting means 247. The motor 404 is disposed parallel to the pump 303 and is connected to the pump 303 by the oil pressure circuit 9. The oil pressure circuit has a flow rate controlling means 9a for controlling the volume of the oil to be supplied to the motor 404 and also has a switching valve which changes the direction of the oil to be supplied to the motor and selectively rotates the motor 404 in the normal direction or in the reverse direction. The first transmission gear 5a, which transmits the torque from the shaft 40' of the motor 404 to the first output shaft 330', comprises a first gear 51 fixed on the shaft 40' of the motor 404, a second gear 52 having a shaft and meshing with the first gear 51, a fifth gear 55 which works as a reverse gear for changing the rotational direction and meshes with the second gear 52, a third gear 53 rotatably supported on the first output shaft 330', and a cone clutch 6c having a cone clutch controlling mechanism 60c for selectively engaging or disengaging the first transmission gear 5a and the first output shaft 330'. The second transmission gear 5b, which transmits the torque from the shaft 40' of the motor 404 to the first output shaft 330' comprises the first and second gears 51 and 52, which are the same as those of the first transmission gear 5a, a fourth gear 54 fixed on the other end of the shaft of the second gear 52, which is rotatably supported on the first output shaft 330', and a one-way clutch 7b which connects the second transmission gear 5b and the first output shaft 330' when the sixth gear 56 rotates faster than the first output shaft 330' in the normal direction. A second output shaft 10' is selectively connected with the first output shaft 330' or with the sixth gear 56 of the second transmission gear 5b by the dog clutch 280. Namely, the dog clutch 280 comprises a first engaging member 281 fixed on the first output shaft 330', a second engaging member 282 fixed on the sixth gear 56 of the second transmission gear 5b, a third engaging member 283 connected to the second output shaft 10', and a connecting member 285 which selectively connects the first and third engaging members 281 and 283 or the second and third engaging members 282 and 283.

As mentioned above, the hydromechanical transmission $A_H$ of the third embodiment is one of the modifications of the first embodiment, and while some of the elements of this embodiment are different from the first embodiment, they work the same as those of the first embodiment. Therefore, the operation and the function of this hydromechanical transmission $A_H$ are almost the same as those of the first embodiment.

The hydromechanical transmission $A_1$ of the fourth embodiment shown in FIG. 11, is adapted to be driven only in the forward direction. However, the hydromechanical transmission $A_1$ can provide an infinitely variable speed ratio based on two different stepdown ranges by a simple operation.

The hydromechanical transmission $A_1$ of the fourth embodiment is characterized in an axial piston type pump 3 and an axial piston type motor 4 being connected with an oil pressure circuit 9, first and second transmission gears 5a and 5b consisting of two series of gears having different stepdown transmission ranges being connected with the output side of a motor shaft 40 of the motor 4, and moreover, in respective other ends of the transmission gears 5a and 5b being connected with the output shaft 330 of the pump 3 through respective multi-plate clutch means 6a and 7a, and the rotary direction of the motor being controlled by an oil switching valve 9a through the direction of an operating oil. Now, the matter will be further explained in detail.

In a rotatable cylindrical drum 30 coupled directly to an input shaft 2 connecting with the motor, not shown, nine cylinders are perforated in the axial direction at regular intervals, and nine reciprocating pistons 31 are fitted into the corresponding cylinders. The rotatable swash plate 34, which is inclined at a constant angle and contacts slidably and opposing to the said reciprocating pistons 31, is fixed as one body on a casing 33, which is provided with the output shaft 330. The whole device consisting of the swash plate 34, casing 33 and output shaft 330 is rotatable as one body.

The motor 4 has the same construction as that of this axial piston type pump 3, namely, nine cylinders 41a are perforated, at regular intervals, into the cylinder drum 41, which is axially supported fixedly against the main casing CI so that the cylinder drum 41 and the main casing CI can relatively rotate freely. Then nine reciprocating pistons 42 are fitted into the cylinders 41a. On the other hand, the tiltable swash plate 44 is disposed opposing against the reciprocating pistons 42 and axially supported at the trunnion shaft 45 fixed to the main casing CI so that the inclination of swash plate 44 can be freely regulated. The oil pressure circuit which has a flow rate regulating valve 9a to change the flowing rate of an operating oil from the oil pump 3 to the oil motor 4, connects the pump 3 and the motor 4. The tiltable swash plate 44 connects with the swash plate controlling means, not shown, as an operation capacity controlling mechanism. This tiltable swash plate controlling means controls the inclined angle of the tiltable swash plate 44 by means of oil pressure so that the suitable speed change ratio is set and the rotating direction of the motor 4 is changed in the normal direction or in the reverse direction.

Now, the transmission gears will be explained. These gears 5a and 5b, comprise two series of gear trains having respectively different stepdown transmission ranges.

With respect to the first transmission gear $5a$, a first gear 51 is fixed at one end of the motor shaft 40 of the motor 4 so that they can rotate as a unit, and a second gear 52, which has an interlocking relation with the first gear 51, is fixed, at one end of a rotatable elongated tubular part 521 supported axially on a supporting shaft 520 fixed on the main casing CI in parallel relation with the output shaft 330 of the pump 3. At the output shaft 330 of the pump 3 and near the second gear 52, a first multi-plate clutch 6a is provided. This multi-plate clutch 6a consists of a first engaging member 61a which has plural engaging surfaces and is fixed on the output shaft 330 of the pump 3, a second engaging member 62a which has plural engaging surfaces opposing the first engaging member 61a and is rotatably supported on the output shaft 330, and a controlling member 60a which connects the first engaging member 61a with the second engaging member 62a in any time desired. A third gear 53 is formed integrally with the second engaging member 62a of the multi-plate clutch 6a to engage with the second gear 52. Torque from the oil pressure motor 4 is then transmitted from the second gear 52, through the third gear 53 and the first multi-plate clutch 6a, to the output shaft 330. With respect to another transmission gear $5b$, a fourth gear 54 is fixed axially at the other end of the elongated tubular part 521 to which the second gear 52 is fixed, and a fifth gear 55 journalled on a supporting shaft 550 of the main casing CI, mutually interlocks with a fourth gear and is used as a reversing mechanism. On the output shaft 330 of the pump 3 and near the fifth gear 55, a second multi-plate clutch 7a is disposed. This second multi-plate clutch 7a has the same construction as that of the first multi-plate mechanism 6a. A sixth gear 56 is formed integrally with a second engaging member 72a to interlock with the fifth gear 55. Torque of the motor 4 is then transmitted from the fifth gear 55, through the sixth gear 56 and the second multi-plate clutch 7a, to the output shaft 330. In this hydromechanical transmission $A_1$ of the fourth embodiment, the second transmission gear having the fifth gear 55, as the reversing mechanisms is set to have a smaller stepdown transmission range than that of the first transmission gear. In this case, the stepdown transmission range means that the rotary ratio of the output shaft is divided by the rotary ratio of the input shaft, and hereafter, we will express this value by stepdown transmission range. Namely, the first transmission gear $5a$ having a larger transmission range rotates in the same direction relative to the rotary direction of the motor shaft 40 of the motor 4, and the second transmission gear $5b$ having a smaller stepdown transmission range and the fifth gear as a reverse mechanism rotates the output shaft 330 reversely relative to the rotational direction of the motor shaft 40 of the motor 4. Therefore, by means of controlling the rotary direction of the motor 4, and at the same time, by controlling selectively the engagement operation of the multi-plate clutchs 6a and 7a which connect the two transmission gears and the output shaft 330, two stepdown transmission ranges of the output shaft 330 can be obtained and a large torque can be generated at the output shaft 330 with the relatively small motor 4 of small capacity.

The operation and the effects of the hydromechanical transmission $A_1$ of the fourth embodiment, described above, will be explained based on the respective operating conditions.

A. Driving at the low stepdown transmission range

1. The switching valve 9a, which is disposed in the oil pressure circuit 9 connecting the oil pump 3 and the motor 4, is set to the low stepdown transmission range. Namely, the flowing direction of the operation oil is set so that the cylinder drum 41 of the motor 4 is driven to rotate in the direction shown with the arrow marked in dotted line in FIG. 11. Hereafter, this direction will be merely called the reverse direction.

2. The second stepdown transmission gear $5b$ is combined with the output shaft 330 by engaging the first and second engaging members 71a and 72a, which are controlled by controlling the controlling member 70a of the second multi-plate clutch 71. On the other hand, the first engaging member 61a of the first multi-plate clutch 6a is not in engaging relation with the second engaging member 62a.

In this hydromechanical transmission of the fourth embodiment, in input shaft 2 which is driven by a motor (not shown) drives the cylinder drum 30 of the pump 3 in the direction shown with the solid arrow, or the normal direction, in FIG. 11, and the cylinder drum 30 relatively rotates opposing against the rotatable swash plate 34 which connects with the output shaft 330 of the pump 3 with the load of the output side of the pump 3. At the same time, the pump 3 generates oil pressure energy through the pumping operation by the relative rotation of the cylinder drum 30 with the rotatable swash plate 34, and the oil pressure energy is supplied to the motor 4 so that the motor 4 is driven to rotate reversely, and thus, this oil pressure energy is regenerated to mechanical energy as the driving torque of the motor 4. This driving torque is transmitted to the second transmission gear $5b$ and finally to the output shaft 330 through the second multi-plate clutch 7a. Namely, it is transmitted from the first gear 51, fixed on the motor shaft 40 of the motor 4, to the second gear 52 which meshes with the first gear 51, and then, the torque is transmitted to the fifth gear 55 and the sixth gear 56 through the fourth gear 54 which is coaxially and integrally formed with the second gear 52, and the output shaft 330 is driven to rotate in the direction shown with the arrow in FIG. 11 or the normal direction, through the second engaging member 72a which is formed integrally with the sixth gear 56 and through the second multi-plate clutch 7a consisting of the first engaging member 71a and the second engaging member 72a connected with the output shaft 330. At the same time, the reaction torque generated directly on the rotatable swash plate 34 by the rotation of the cylinder drum 30 of the pump 3 rotates the output shaft 330 through the swash plate 34. Thus, the output shaft 330 is effectively driven in the normal direction with reaction torque of the pump 3 and with the regenerated driving torque from the motor 4. In this case, the motor 4 drives the respective gears 51, 52 and 54 and the third gear 53 rotates idly in the reverse direction in relation with the output shaft 330 of the pump 3, because the first multi-plate clutch 6a is not in the engaging relation, and therefore, torque is not transmitted to the output shaft 330 of the pump 3, through the third gear 53. The gear ratio of the gear train consisting of these gears 51, 52, 54, 55 and 56 is set small so that the rotary ratio of the motor 4 is transmitted to be reduced to the output shaft 330, and the large torque is transmitted to the output shaft 330.

B. Driving at the high stepdown transmission range

1. The switching valve provided in the oil pressure circuit 9 connecting the pump 3 and the motor 4, is set to the high stepdown transmission range.

Namely, the flowing direction of the operation oil is set reversely relative to the case of the low stepdown transmission range to rotate the motor 4 in the direction shown with the arrow marked with solid line.

2. The first transmission gear 5a is connected with the output shaft 330 by engaging the first and second engaging members 61a and 62a which are controlled by the controlling member 60a of the first multi-plate clutch 6a. At the same time, the second multi-plate clutch 7a is not in engaging relation.

In this case, the motor drives the cylinder drum 30 of the pump 3 is the normal direction, and the pumping operation is carried out by the rotation of the cylinder drum 30 relative to the swash plate 34, and oil pressure energy is generated to be supplied to the motor 4. Then the motor 4 is rotated in the direction, the normal direction, marked with solid line in FIG. 11. This rotary direction is reverse against the case of the low stepdown transmission range. Thus, the mechanical energy as the driving torque is regenerated from this oil pressure energy. On the other hand, the torque reaction force as the reaction of the pump operation, is transmitted from the motor, the input shaft 2 to the cylinder drum 30 of the pump 3 and the output shaft 330 integrally formed as one body with the swash plate 34, is driven to rotate in the direction shown with the arrow line.

Therefore, the torque reaction force of the pump 3 drives the output shaft 330 in the normal direction and besides, the regenerated driving torque, which is generated as regenerated mechanical energy by means of the motor 4, drives to rotate the third gear in the normal direction through the first stepdown transmission gear 5a. Namely, the torque is transmitted from the first gear 51 fixed on the motor shaft 40 of the motor 4 to the second gear 52 being in interlocking relation with the first gear 51. Then the torque is transmitted to the output shaft 330 from the second gear 52 through the third gear 53 and the first multi-plate clutch 6a, and rotates the output shaft 330 in the normal direction. At the same time, the reaction torque generated directly on the rotatable swash plate 4 by the rotation of the cylinder drum 30 of the pump 3 rotates the output shaft 330 through the rotatable swash plate 34. Thus, together with the reaction torque and the torque generated by the motor 4, the output shaft 330 is effectively driven.

In this case, the stepdown ratio of the first stepdown transmission gear 5a, consisting of the gears 51, 52 and 53, is set to be of large scale, so that the output shaft 330 is driven with a high speed compared with the case of the driving of the low stepdown transmission range. Further, as the inclination of the variable swash plate 44 decreases, the motor 4 is driven faster under a constant oil pressure energy, and the reaction torque generated on the rotatable swash plate 34 is increased, so that the rotation of the output shaft 330 is increased, and finally the rotation of the output shaft 330 becomes equal to the cylinder drum 30 of the pump 3. In this condition, the motor and the output shaft 330 rotate at the same ratio.

As known from the description above, in case of the hydromechanical transmission A1 of the fourth embodiment, the oil switching valve 9a, which is disposed in the oil pressure circuit 9 connecting the pump 3 and the motor 4 is controlled in response to the driving condition and selects the flowing direction of the operation oil in the normal direction or in the reverse direction, and the rotary direction of the cylinder drum 41 of the motor 4 in the normal or in the reverse direction. Then two stepdown transmission gears 5a and 5b with different stepdown ranges, are selectively operated to transmit the torque generated by the motor 4. So, the stepdown transmission ratio can be set to be wide, and it is also able to generate large torque. Therefore a variable displacement motor of small capacity can be employed, and besides, the whole size of the hydromechanical transmission A1, which partially provides cooperation between the two speed change transmitting mechanisms 5a and 5b, can be made compact, and the same defects caused by the prior art transmission of large size can be resolved.

Also, in the hydromechanical transmission A1 of the fourth embodiment, the torque can be very effectively transmitted by means of the hydromechanical operation, both in the case of the low and high stepdown transmission ranges.

Besides, the continuous high speed driving of the hydromechanical transmission and the high performance can be carried out by the hydromechanical transmission of small size.

Moreover, the power of the engine can be utilized at the maximum limit to generate the largest torque, the acceleration efficiency can be improved, and the fuel-power ratio also can be improved by means of, for example, driving the hydromechanical transmission at the best condition both in the low and high stepdown transmission ranges.

The hydromechanical transmission $A_2$ of the fifth embodiment, shown diagrammatically in FIG. 12, is one of the modifications of the hydromechanical transmission $A_1$ of the fourth embodiment. Most of the parts and constructions of the hydromechanical transmission $A_2$ of this embodiment are the same as those of the fourth embodiment. Only the arrangement of the pump 3, motor 4, the two stepdown transmission gears and the first and second clutch means is different from the fourth embodiment. Also, the valve means for changing the rotational direction of the motor 4 is provided with a valve operating mechanism $C_2$ which operates the valve means automatically to change the direction of the operation oil to be supplied to the motor 4 when the rotational speed of the engine 1 reaches the determined value.

The construction of the hydromechanical transmission $A_2$ of the fifth embodiment will be explained with relation to FIG. 12. However, mainly its differences, compared with the previous embodiments, will be described. In FIG. 12, the parts which are the same as those of the fourth embodiment will be shown with the same reference characters as in FIG. 11, and the description about them will be omitted.

The arrangement of the pump 3 and motor 4 of this embodiment is different from the fourth embodiment, but is the same as that of the second embodiment. Namely, the pump 3 and motor 4 are positioned coaxially, and the motor 4 fixed on the cylindrical shaft 40 is rotatably supported on the output shaft 330 of the pump 3. As the first stepdown transmission gear $5a$ and the first clutch means, only a first one-way clutch $6b$ is provided between the cylindrical shaft 40 and the output shaft 330. The first one-way clutch $6b$, which is the same as that of the first embodiment, engages the cylindrical shaft 40 and the output shaft 330 when the cylindrical shaft rotates faster than the output shaft 330 in the normal direction. The second stepdown transmission gear $5b$, which transmits the torque on the motor 4 rotated in the reverse direction, comprises a gear train of a first gear 51, a fifth gear 55 working as a reverse mechanism, a second gear 52, a fourth gear 54 and a sixth gear 56. A second one-way clutch $7b$ supported on the output shaft 330 engages the sixth gear 56 and the output shaft 330 when the sixth gear 56 rotates faster than the output shaft 330 in the normal direction. The construction of the second one-way clutch $7b$ is the same as that of the first one-way clutch $6b$.

Thus, the hydromechanical transmission $A_2$ of the fifth embodiment described above can provide an infinitely variable speed ratio in two different stepdown transmission ranges, as well as the hydromechanical transmission $A_1$ of the fourth embodiment. Further, in the hydromechanical transmission $A_2$ of the fifth embodiment, the driving at the low stepdown transmission range is automatically shifted to the driving at the high stepdown transmission range by means of the valve means having the valve operating mechanism $C_2$ according to the rotational speed of the engine 1, or vice versa.

The hydromechanical transmission $A_3$ of the sixth embodiment, shown diagrammatically in FIG. 13, is another modification of the hydromechanical transmission $A_1$ of the fourth embodiment. The construction and operation of the hydromechanical transmission $A_3$ of this embodiment are the same as the fifth embodiment except for the second stepdown transmission gear $5b$ and the valve operating mechanism of the valve means for changing the direction of the operation oil to be supplied to the motor 4.

Namely, instead of the gear train $5b$ and the valve operating mechanism $C_2$ of the fifth embodiment, the hydromechanical transmission $A_3$ is provided with a differential gear train which is the same as that of the second embodiment, and the valve operating mechanism $C_3$ which automatically operates the valve means to change the direction of the operation oil when the rotational speed of the output shaft 330 reaches the determined speed. The other parts and construction of the hydromechanical transmission $A_3$ of the sixth embodiment are the same as those of the fifth embodiment. Therefore the explanations about them are omitted.

Also the operation and functions of the hydromechanical transmission $A_3$ of the sixth embodiment are the same as those of the fifth embodiment.

The hydromechanical transmission $A_4$ of the seventh embodiment, shown diagramatically in FIG. 14, is another modification of the hydromechanical transmission $A_1$ of the fourth embodiment. The only differences from the fourth embodiment are a variable displacement motor and a first clutch means. Namely, instead of the variable axial piston type motor 4 and the first multi-plate clutch $6a$, a variable displacement vane type motor 14 and a cone clutch $6c$ are employed. The vane type motor 14 works the same as the axial piston type motor 4 of the fourth embodiment. However, the cone clutch $6c$ is somewhat different in its functions from the one-way clutch of the fifth embodiment. The cone clutch can be forcedly operated together with the valve means for changing the direction of the operated oil when the engine brake is necessary. Therefore, the hydromechanical transmission $A_4$ of the seventh embodiment can effect an engine braking in addition to an infinitely variable speed ratio in two different stepdown transmission ranges.

Now, the hydromechanical transmission $A_4$ of the seventh embodiment will be described with relation to FIG. 14, but the explanation about the same parts as those of the fourth embodiment will be omitted.

The variable displacement vane motor 14, which is disposed parallel to the displacement pump 3, comprises a rotator 143 having a plurality of vanes and a shaft 140, and a shiftable casing 144 which moves perpendicular to the axis of the rotator 143 to vary the displacement of the motor 14 by means of an adjusting means 147, which is the same as the adjusting means 247 of the third embodiment, as shown in FIG. 10.

The cone clutch $6c$ is also the same as that of the first embodiment and is operated by the clutch control means $60c$ connecting to the valve means for changing the direction of the operation oil to be supplied to the vane motor 14. The clutch control means $60c$ operates the cone clutch $6c$ to engage the first engaging member $61c$ fixed on the output shaft 330 with the second engaging member $62c$ fixed on the third gear 53 of the first step down transmission gear $5a$ when the vane motor is driven in the normal direction by setting the valve means.

The hydromechanical transmission $A_5$ of the eighth embodiment, shown diagramatically in FIG. 15 is another modification of the hydromechanical transmission $A_1$ of the fourth embodiment, and the constructions of this embodiment are almost the same as those of the sixth embodiment except for the second clutch means $7b$ and the valve operating mechanism. Namely, the axial piston type pump 3 and motor 4 are arranged coaxially, and the first stepdown transmission gear $5a$ is composed of a one-way clutch and the second stepdown transmission gear $5b$ is composed of a differential gear.

As the second clutch means, a multi-plate clutch $7a$ is provided, instead of the one-way clutch of the sixth embodiment. This multi-plate clutch $7a$ has the same construction as that of the fourth embodiment and is operated to engage or to disengage the first engaging member $71a$ fixed on the output shaft 330 with the second engaging member $72a$ by the clutch means $70a$ connecting to the valve means for changing the direction of the operation oil to be supplied to the axial piston type motor 4. The multi-plate clutch $7a$ is forcedly operated to engage the first engaging member $71a$ with the second engaging member $72a$ by the clutch control means $70a$ when the axial piston type motor 4 is driven in the reverse direction by setting the valve means.

The valve operating mechanisms $C_5$ automatically operates the valve means to change the direction of the operation oil when the inclination of the throttle valve of the carburetor of the engine 1 reaches the determined degree.

Thus, the hydromechanical transmission $A_5$ of the eighth embodiment works the same as the hydromechanical transmission $A_4$ of the seventh embodiment.

Various other modifications and variations of the present invention are possible in light of these teach-

What is claimed as new and desired to be secured by Letters Patent of the United States is:

1. A hydromechanical transmission comprising:
a main casing;
an input shaft rotatably supported within said main casing;
an output shaft rotatably supported within said main casing;
a positive displacement pump including a first rotator drivingly connected to said input shaft and a second rotator drivingly connected to said output shaft;
a variable positive displacement motor being rotatable normally and reversely and including a rotatable first motor member having a motor shaft, a second motor member supported within said main casing and displacement controlling means for controlling the displacement of the motor;
an oil pressure circuit including two conduit means operative to establish fluid communication between the intake of said pump and the output of said motor and between the output of said pump and the input of said motor;
switching means for changing the rotational direction of said motor;
a first stepdown transmission means having a first clutch means provided between the motor shaft of the rotatable first motor member and said output shaft for engaging the motor shaft of the rotatable first motor member with said output shaft when the motor rotates in its normal direction; and
a second stepdown transmission means having a second clutch means, a reverse mechanism, and a different stepdown transmission range from that of said first stepdown transmission means, and provided between the motor shaft of the rotatable first motor member and said output shaft for engaging the motor shaft of the rotatable first motor member with said output shaft when the motor rotates in its reverse direction.

2. A hydromechanical transmission according to claim 1, further comprising flow rate regulating means between the two conduit means for regulating the flow rate of the fluid to the input of the motor by short circuiting a part of the fluid directly from one of the conduit means to the other conduit means.

3. A hydromechanical transmission according to claim 2, wherein:
said positive displacement pump including the first rotator and the second rotator is an axial piston type pump; and
said variable positive displacement motor having the rotatable first motor member and the second motor member is an axial piston type motor.

4. A hydromechanical transmission according to claim 2, wherein said positive displacement pump including the first rotator and the second rotator is a gear pump.

5. A hydromechanical transmission according to claim 2, wherein said variable positive displacement motor having the rotatable first motor member and the second motor member is a vane type motor.

6. A hydromechanical transmission according to claim 2, wherein said variable positive displacement motor having the rotatable first motor member and the second motor member is a radial piston type motor.

7. A hydromechanical transmission according to claim 2, wherein the first clutch means and second clutch means are one-way clutches.

8. A hydromechanical transmission according to claim 2, wherein one of the first and second clutch means is a one-way clutch and the other is a multi-plate clutch.

9. A hydromechanical transmission according to claim 2, wherein one of the first and second clutch means is a one-way clutch and the other is a cone clutch.

10. A hydromechanical transmission according to claim 2, wherein said switching means is a selector valve provided within the oil pressure circuit which switches the fluid communication between the intake of said pump and the output of said motor and between the output of said pump and the input of said motor into fluid communication between said intake of said pump and said input of said motor and between said output of said pump and said output of said motor, and vice versa, whereby the rotational direction of the rotatable first motor member is switched from a normal direction to a reverse direction, and vice versa.

11. A hydromechanical transmission according to claim 2, wherein said variable positive displacement motor is an axial piston type motor having a rotatable cylinder drum as the rotatable first motor member and a tiltable swash plate as the second motor member.

12. A hydromechanical transmission according to claim 11, wherein said displacement controlling means is provided within the main casing for controlling the inclination of said tiltable swash plate and for controlling the displacement of said motor.

13. A hydromechanical transmission according to claim 11, wherein said switching means is connected to said tiltable swash plate for switching the inclination of said tiltable swash plate from the one side to the other, or vice versa for thereby changing the rotational direction of said motor.

14. A hydromechanical transmission according to claim 2, wherein said variable positive displacement motor is a radial piston type motor having a rotor provided with a shaft as the rotatable first motor member, and a shiftable casing provided with a plurality of cylinders and pistons as the second motor member.

15. A hydromechanical transmission according to claim 2, wherein said variable positive displacement motor is provided parallel to the axis of said positive displacement pump and the motor shaft of said rotatable first motor member of the motor is journalled within the main casing.

16. A hydromechanical transmission according to claim 15, wherein said first and second stepdown transmission means are composed of gear trains.

17. A hydromechanical transmission according to claim 2, wherein said motor shaft is a cylindrical member which is rotatably and coaxially supported on said output shaft.

18. A hydromechanical transmission according to claim 2, wherein one of said first and second transmission means is composed of a one-way clutch and the other is a differential gear train.

19. A hydromechanical transmission according to claim 2, wherein:
   said output shaft is composed of a first output shaft drivingly connected to said second rotator of said positive displacement pump and a second output shaft which is connectable to the first output shaft by a dog clutch, and
   one of said first and second stepdown transmission means is disposed between the motor shaft of the rotatable first motor member and said first output shaft.

20. A hydromechanical transmission according to claim 19, wherein the other of said first and second stepdown transmission means has a one-way clutch as its clutch means and is disposed between the motor shaft of the rotatable first motor member of the motor and said second output shaft.

21. A hydromechanical transmission according to claim 20, wherein said dog clutch is composed of a first engaging member fixed on said first output shaft, a second engaging member fixed on said second output shaft, a third engaging member fixed on a last gear member of the other transmission means, and a connecting member which connects selectively said first engaging member and said second engaging member or said second engaging member and said third engaging member.

22. A hydromechanical transmission comprising:
   a main casing;
   an input shaft rotatably supported within said main casing;
   an output shaft rotatably supported within said main casing;
   an axial piston type pump including a rotatable cylinder drum perforated with a plurality of cylinders and drivingly connected to said input shaft, a rotatable swash plate drivingly connected said output shaft, and pistons being fitted in each of the cylinders of said cylindrical drum and being set against the swash plate;
   an axial piston type motor including a rotatable cylinder drum perforated with a plurality of cylinders and fixed on a motor shaft which is parallel to the output shaft and is journalled within said main casing, a tiltable swash plate supported on a trunion shaft journalled within said main casing, displacement controlling means for controlling the displacement of the motor, and pistons being fitted in each of the cylinders of the cylindrical drum of the motor and being set against the tiltable swash plate;
   an oil pressure circuit, including two conduit means, operative to establish fluid communication between the intake of the pump and the output of the motor and between the output of the pump and the input of the motor or between said intake of the pump and said input of the motor and between said output of the pump and said output of the motor;
   flow rate regulating means provided between said two conduit means for regulating the flow rate of the fluid to be supplied to the motor by short-circuiting a part of the fluid from one of the two conduit means to the other;
   two-way valving means for changing the fluid communication between the intake of said pump and the output of said motor and between the output of said pump and the input of said motor into fluid communication between said intake of said pump and said input of said motor and between said output of said pump and said output of said motor;
   a first stepdown transmission gear provided between the motor shaft of the cylinder drum of the motor and said output shaft and composed of a first gear fixed on the motor shaft, a second gear fixed on one of the ends of a shaft journalled on the main casing and meshing with said first gear, a third gear rotatably supported on said output shaft and meshing with said second gear and first clutch means for engaging said third gear and said output shaft when said third gear rotates in the same direction as that of said output shaft; and
   a second stepdown transmission gear having a different stepdown transmission range from that of said first stepdown transmission gear, provided between the motor shaft and said output shaft and composed of said first gear, said second gear, a fourth gear fixed on the other end part of the shaft one which said second gear is fixed, a fifth gear as a reverse mechanism journalled on a shaft fixed on said main casing and meshing with said fourth gear, a sixth gear rotatably supported on said output shaft and meshing with said fifth gear, and a second clutch means fixed on said sixth gear for engaging said sixth gear and said output shaft when said sixth gear rotates in the same direction as that of said output shaft.

23. A hydromechanical transmission according to claim 22, wherein said first clutch means is a one-way clutch and said second clutch means is another one-way clutch.

24. A hydromecanical transmission according to claim 22, wherein said first clutch means is a one-way clutch means and said second clutch means is a multi-plate clutch.

25. A hydromechanical transmission according to claim 22, wherein said first clutch means is a one-way clutch means and said second clutch means is a cone clutch.

26. A hydromechanical transmission according to claim 22, wherein said first clutch means is a multi-plate clutch and said second clutch means is another multi-clutch plate.

27. A hydromechanical transmission including:
   a main casing;
   an input shaft rotatably supported within said main casing;
   a first output shaft rotatably supported within said main casing;
   a second output shaft being coaxial with said first output shaft and rotatably supported within said main casing;
   an axial piston type pump including a rotatable cylinder drum perforated with a plurality of cylinders and drivingly connected to said input shaft, a rotatable swash plate drivingly connected to the first output shaft, and pistons being fitted in each of the cylinders of the cylindrical drum and being set against said swash plate;
   an axial piston type motor including a rotatable cylinder drum perforated with a plurality of cylinders and fixed on a motor shaft which is parallel to said output shaft and is journalled within said main casing, a tiltable swash plate supported on a trunnion shaft journalled within said main casing, displacement controlling means for controlling the displacement of the motor, and pistons being fitted in each of the cylinders of the cylinder drum of the motor and being set against the tiltable swash plate;

an oil pressure circuit, including two conduit means, operative to establish fluid communication between the intake of said pump and the output of said motor and between the output of said pump and the input of said motor;

flow rate regulating means provided between the two conduit means for regulating the flow rate of the fluid to be supplied to said motor by short circuiting a part of the fluid from one of the two conduit means to the other;

switching means connected to said tiltable said tiltable swash plate for switching the inclination of said tiltable swash plate from the left to the right, or vice versa, thereby changing the rotational direction of said motor;

a first stepdown transmission gear provided between the motor shaft of the cylinder drum of said motor and said output shaft and composed of a first gear fixed on said motor shaft a second gear fixed one one of the end parts of a shaft journalled on the main casing and meshing with the first gear, a third gear rotatably supported on said output shaft and meshing with said second gear, and first clutch means for engaging said third gear and the first output shaft when said third gear rotates in the same direction as that of said output shaft;

a second stepdown transmission gear having a different stepdown transmission range from that of the first stepdown transmission gear, being provided between said motor shaft and said output shaft and composed of said first gear, said second gear, a fourth gear fixed on the other end part of the shaft on which said second gear is fixed, a fifth gear as a reverse mechanism journalled on a shaft fixed on said main casing and meshing with said fourth gear, a sixth gear rotatably supported on the second output shaft and meshing with said fifth gear, and a one-way clutch fixed on said sixth gear for engaging said sixth gear and said second output shaft when said sixth gear rotates faster than said second output shaft in the normal direction; and a dog clutch disposed among the first and second output shafts and said sixth gear and composed of a first engaging member fixed on said first output shaft, a second engaging member fixed on said second output shaft, a third engaging member fixed on said sixth gear, and a slidable connecting member which engages or disengages said first and second engaging members and said second and third engaging members.

28. A hydromechanical transmission including:
a main casing;
an input shaft rotatably supported within said main casing;
a first output shaft rotatably supported within said main casing;
a second output shaft rotatably supported within said main casing;
a positive displacement pump including a first rotator drivingly connected to said input shaft and a second rotator drivingly connected to said output shaft;
a variable positive displacement motor being rotatable normally and reversely and including a rotatable first motor member having a motor shaft, a second motor member supported within said main casing and displacement controlling means for controlling the displacement of said motor;

an oil pressure circuit including two conduit means operative to establish fluid communication between the intake of said pump and the output of said motor and between the output of said pump and the input of said motor;

switching means for changing the rotational direction of said motor;

a first stepdown transmission means having a first clutch means provided between the motor shaft of the rotatable first motor member and the first output shaft, the first clutch means engaging with the first output shaft when the motor rotates in the normal direction;

a second stepdown transmission means having a second clutch means, a reverse mechanism, and a different stepdown transmission range from that of the first stepdown transmission means, being provided between the motor shaft of the rotatable first motor member and one of the first and second output shafts, the second clutch means engaging said one of said first and second output shafts when the motor rotates sin the normal directions;

third clutch means disposed among the first and second output shafts and the last member of the second stepdown transmission means for connecting the first output shaft with the second output shaft when the second output shaft is driven in the normal direction, and for connecting the second output shaft with the last member of the second transmission means when the second output shaft is driven in the reverse direction.

29. A hydromechanical transmission according to claim 28, wherein:
said first clutch means is a multi-plate clutch;
said second clutch is a one-way clutch; and
said third clutch is a dog clutch composed of a first engaging member fixed on the first output shaft, a second engaging member fixed on the second output shaft, a third engaging member fixed on the last member of the second transmission means and a slidable connecting member which engages or disengages the first and second engaging members and the second and third engaging members.

30. A hydromechanical transmission according to 28, wherein:
said first clutch means is a cone clutch;
said second clutch is a one-way clutch; and
said third clutch is a dog clutch composed of a first engaging member fixed on the first output shaft, a second engaging member fixed on the second output shaft, a third engaging member fixed on the last member of the second transmission means and a slidable connecting member which engages or disengages the first and second engaging members and the second and third engaging members.

31. A hydromechanical transmission according to claim 28, further comprising flow rate regulating means between the two conduit means for regulating the flow rate of the fluid to the input of the motor by short-circuiting a part of the fluid directly from one of the conduit means to the other conduit means.

32. A hydromechanical transmission according to claim 31, wherein:

said positive displacement pump including the first rotator and the second rotator is an axial piston type pump; and said variable positive displacement motor having the rotatable first motor member and the second motor member is an axial piston type motor.

33. A hydromechanical transmission according to claim 31, wherein said positive displacement pump including the first rotator and the second rotator is a gear pump.

34. A hydromechanical transmission according to claim 31, wherein said variable positive displacement motor having the rotatable first motor member and the second motor member is a vane type motor.

35. A hydromechanical transmission according to claim 31, wherein said variable positive displacement motor having the rotatable first motor member and the second motor member is a radial piston type motor.

36. A hydromechanical transmission according to claim 31, wherein the first clutch means and second clutch means are one-way clutches.

37. A hydromechanical transmission according to claim 31, wherein one of the first and second clutch means is a one-way clutch and the other is a multi-plate clutch.

38. A hydromechanical transmission according to claim 31, wherein one of the first and second clutch means is a one-way clutch and the other is a cone clutch.

39. A hydromechanical transmission according to claim 31, wherein said switching means is a selector valve provided within the oil pressure circuit which switches the fluid communication between the intake of said pump and the output of said motor and between the output of said pump and the input of said motor into fluid communication between said intake of said pump and said input of said motor and between said output of said pump and said output of said motor, and vice versa, whereby the rotational direction of the rotatable first motor member is switched from a normal direction to a reverse direction, and vice versa.

40. A hydromechanical transmission according to claim 31, wherein said variable positive displacement motor is an axial piston type motor having a rotatable cylinder drum as the rotatable first motor member and a tiltable swash plate as the second motor member.

41. A hydromechanical transmission according to claim 40, wherein said displacement controlling means is provided within the main casing for controlling the inclination of said tiltable swash plate and for controlling the displacement of said motor.

42. A hydromechanical transmission according to claim 40, wherein said switching means is connected to said tiltable swash plate for switching the inclination of said tiltable swash plate from the one side to the other, and vice versa for thereby changing the rotational direction of said motor.

43. A hydromechanical transmission according to claim 31, wherein said variable positive displacement motor is a radial piston type motor having a rotor provided with a shaft as the rotatable first motor member, and a shiftable casing provided with a plurality of cylinders and pistons as the second motor member.

44. A hydromechanical transmission according to claim 31, wherein said motor shaft is a cylindrical member which is rotatably and coaxially supported on said output shaft.

45. A hydromechanical transmission according to claim 31, wherein said variable positive displacement motor is provided parallel to the axis of said positive displacement pump and the motor shaft of said rotatable first motor member of the motor is journalled within the main casing.

46. A hydromechanical transmission according to claim 45, wherein said first and second stepdown transmission means are composed of gear trains.

* * * * *